(12) United States Patent
Ishikawa et al.

(10) Patent No.: US 12,014,614 B2
(45) Date of Patent: Jun. 18, 2024

(54) REGION DETERMINING DEVICE, MONITORING SYSTEM, REGION DETERMINING METHOD, AND RECORDING MEDIUM

(71) Applicant: NEC Corporation, Tokyo (JP)

(72) Inventors: Masumi Ishikawa, Tokyo (JP); Takahiro Toizumi, Tokyo (JP)

(73) Assignee: NEC CORPORATION, Tokyo (JP)

(*) Notice: Subject to any disclaimer, the term of this patent is extended or adjusted under 35 U.S.C. 154(b) by 960 days.

(21) Appl. No.: 16/977,529

(22) PCT Filed: Mar. 11, 2019

(86) PCT No.: PCT/JP2019/009576
§ 371 (c)(1),
(2) Date: Sep. 2, 2020

(87) PCT Pub. No.: WO2019/176826
PCT Pub. Date: Sep. 19, 2019

(65) Prior Publication Data
US 2020/0402385 A1    Dec. 24, 2020

(30) Foreign Application Priority Data
Mar. 14, 2018 (JP) .................. 2018-046134

(51) Int. Cl.
*G08B 21/10* (2006.01)
*G01C 13/00* (2006.01)
(Continued)

(52) U.S. Cl.
CPC ............ *G08B 21/10* (2013.01); *G01C 13/00* (2013.01); *G01F 23/292* (2013.01); *G06T 7/11* (2017.01);
(Continued)

(58) Field of Classification Search
CPC .. G08B 21/10; G06T 7/11; G06T 2207/20084; G06T 2207/30181; G01C 13/00; G01F 23/292
See application file for complete search history.

(56) References Cited

U.S. PATENT DOCUMENTS

2008/0298636 A1* 12/2008 Rasheed ............... G06T 7/215
382/103
2012/0269381 A1* 10/2012 Choo .................... G08B 21/18
382/100
(Continued)

FOREIGN PATENT DOCUMENTS

| JP | 2001-281046 A | 10/2001 |
| JP | 2008-072636 A | 3/2008 |
| JP | 6125137 B1 | 5/2017 |

OTHER PUBLICATIONS

Sakaino, "Camera-Vision-Based Water Level Estimation", IEEE Sensors Journal, vol. 16, No. 21, Nov. 1, 2016, pp. 7564-7565 (Year: 2016).*
(Continued)

*Primary Examiner* — Nay A Maung
*Assistant Examiner* — Jose M Torres
(74) *Attorney, Agent, or Firm* — Sughrue Mion, PLLC

(57) ABSTRACT

A region determining device includes a likelihood calculating unit that calculates a likelihood of wetness of a pixel in an image including a plurality of frames, a non-water pixel measuring unit that measures the number of non-water pixels in which the likelihood falls within a first non-water range in any one of determination regions to be determined in the respective frames, a boundary pixel measuring unit that measures the number of boundary pixels in which the likelihood falls within a first water range in any one of the determination regions and the likelihood falls within a second non-water range in any one of the determination
(Continued)

regions, and a region determining unit that determines whether the determination region satisfies a predetermined determination condition based on the number of non-water pixels and the number of boundary pixels.

10 Claims, 11 Drawing Sheets

(51) Int. Cl.
  *G01F 23/292* (2006.01)
  *G06T 7/11* (2017.01)
(52) U.S. Cl.
  CPC ............... *G06T 2207/20084* (2013.01); *G06T 2207/30181* (2013.01)

(56) References Cited

U.S. PATENT DOCUMENTS

2020/0202556 A1* 6/2020 Maehara .................... G06T 7/73
2020/0410838 A1* 12/2020 Ishikawa .............. G06V 10/751

OTHER PUBLICATIONS

International Search Report for PCT/JP2019/009576 dated Jun. 4, 2019 (PCT/ISA/210).
Written Opinion for PCT/JP2019/009576 dated Jun. 4, 2019 (PCT/ISA/237).

* cited by examiner

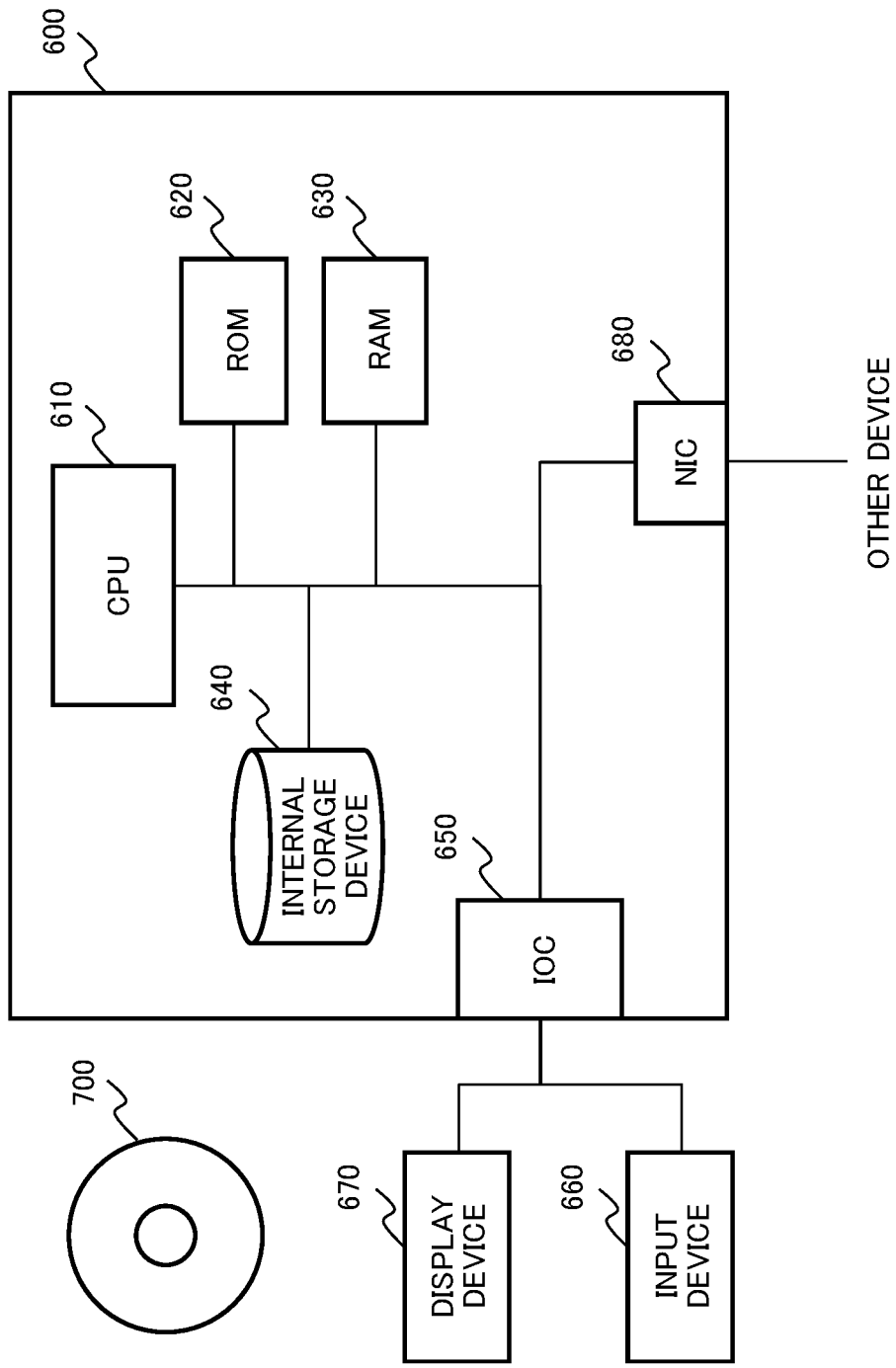

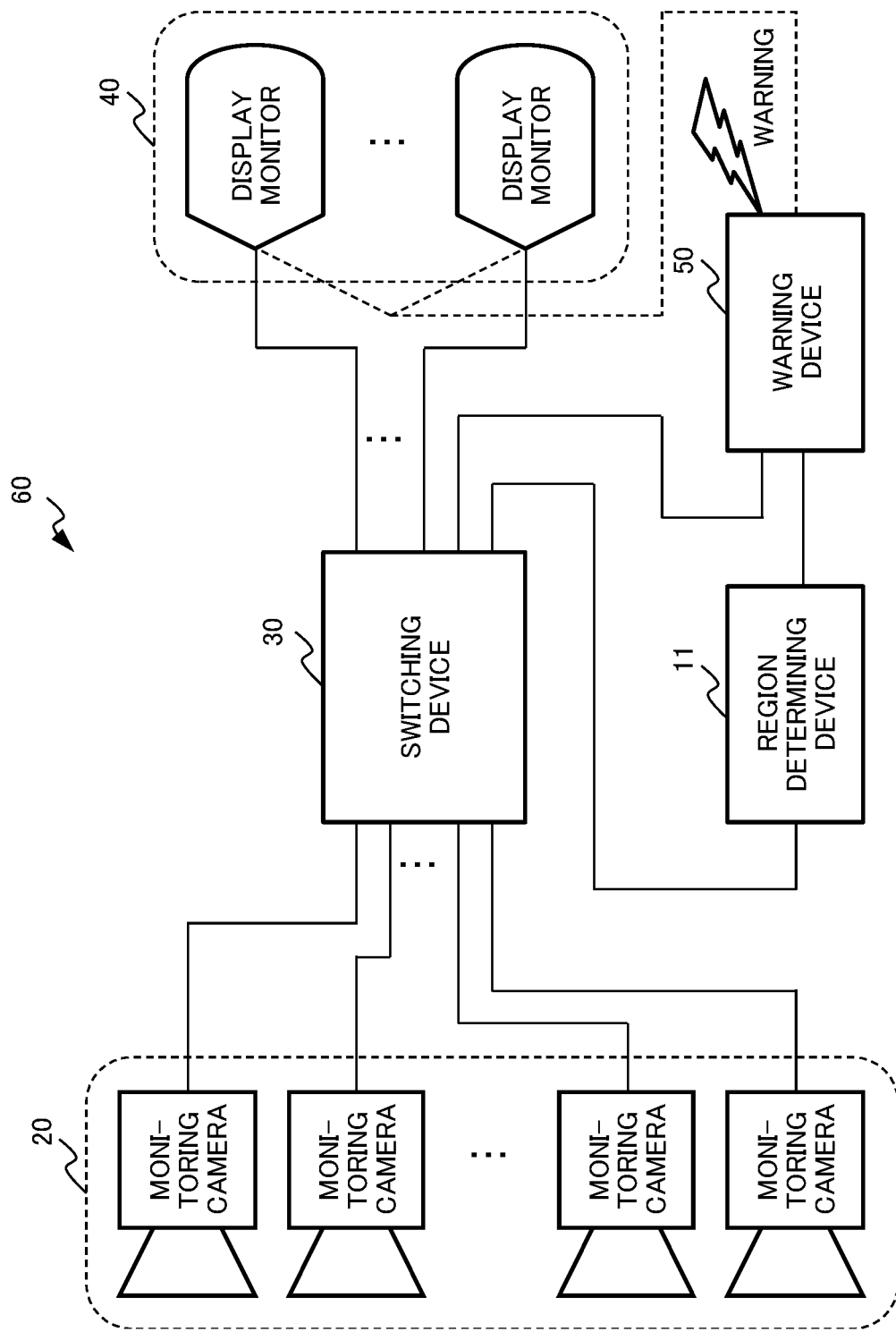

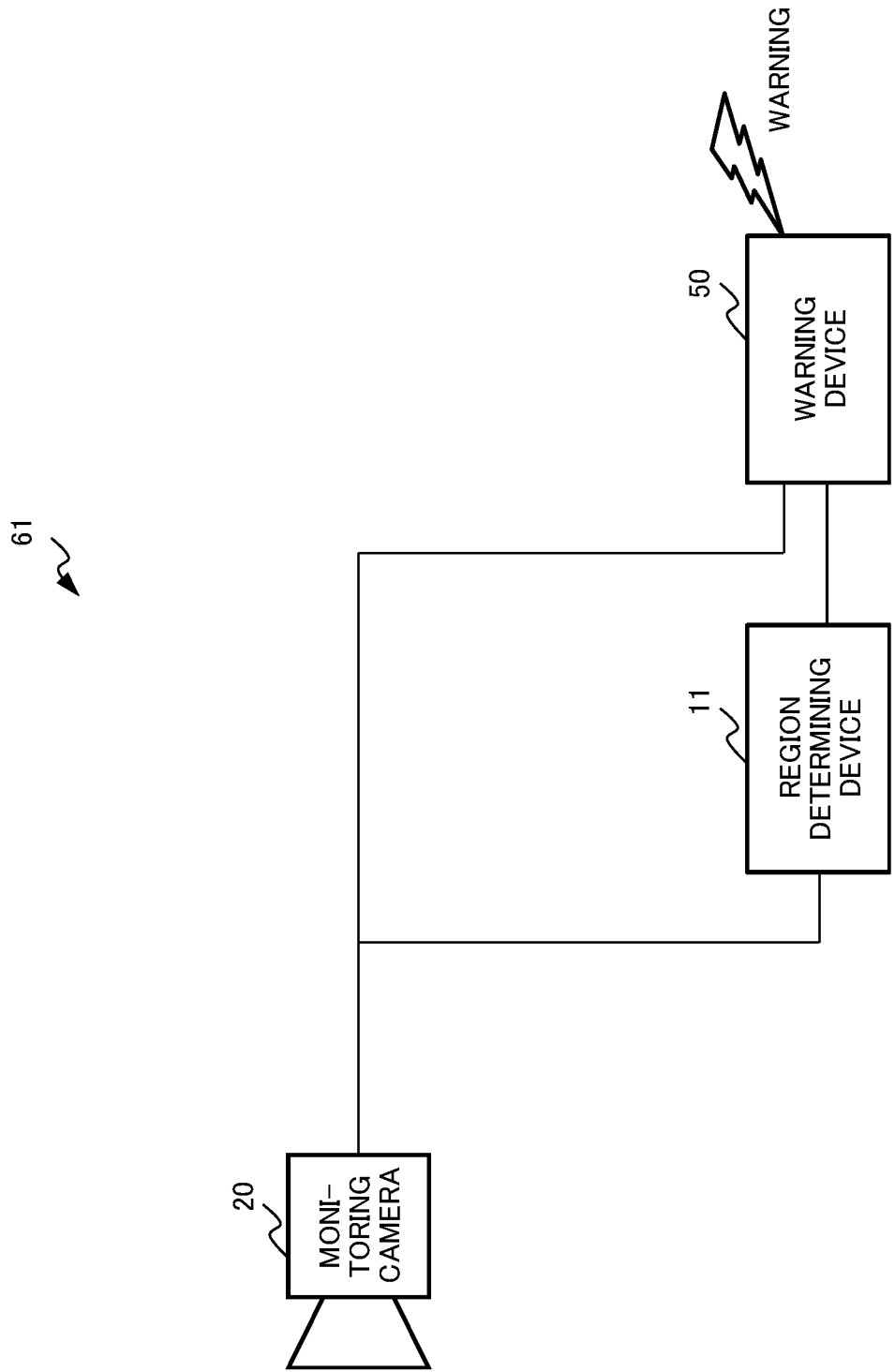

REGION DETERMINING DEVICE, MONITORING SYSTEM, REGION DETERMINING METHOD, AND RECORDING MEDIUM

CROSS REFERENCE TO RELATED APPLICATIONS

This application is a National Stage of International Application No. PCT/JP2019/009576 filed Mar. 11, 2019, claiming priority based on Japanese Patent Application No. 2018-046134 filed Mar. 14, 2018, the disclosure of which is incorporated herein in its entirety by reference.

TECHNICAL FIELD

The present invention relates to image processing, and more particularly, to a region determining device that determines a region in an image or the like.

BACKGROUND ART

A river office that monitors a water level of a river uses a monitoring camera for monitoring the water level of the river. Then, a staff (observer) of the river office checks a dangerous water level or the like based on an image of the monitoring camera.

There is a plurality of monitoring points of the river. Therefore, a plurality of monitoring cameras is provided. In some river offices, several hundreds of monitoring cameras are provided.

In such a river office, it is difficult to include a display monitor for each monitoring camera because the number of display monitors becomes too large. Even a large number of display monitors are provided, the number of monitors that can be monitored by the observer is limited.

Therefore, in a general monitoring system, images from the monitoring cameras are displayed while being switched at predetermined intervals. In general, the switching interval is from several seconds to a dozen seconds. The observer checks the images to be switched at the predetermined intervals on the display monitor. In a case where the plurality of display monitors is provided, the images from the monitoring cameras respectively assigned to the display monitors are displayed on the display monitors while being switched at the predetermined intervals.

However, in such a monitoring system, the images are switched at short intervals on the display monitor. Therefore, a time used for the check by the observer is limited. Therefore, there is a possibility that accuracy of the check by the observer is lowered. In particular, in a case where the plurality of display monitors is provided, it is necessary for the observer to monitor the plurality of display monitors on which the images are switched. Therefore, it is assumed that the accuracy of the check by the observer be lowered.

The image of the monitoring camera is repeatedly displayed on the display monitor. Therefore, even if the observer overlooks danger in the first display, the observer can detect the danger or the like in the displayed image eventually. However, in this case, a possibility is assumed that the detection is delayed in terms of time.

If the switching interval of the monitoring camera is lengthened, the possibility of the overlooking by the observer is reduced. However, in this case, a time required for checking the images of all the monitoring cameras becomes longer. As a result, a time required for checking all the images becomes longer. Therefore, in this case, there is a possibility that the detection by the observer is delayed in terms of time.

There is a possibility that a human error occurs in the check by the observer.

As a measure to solve the problems in the check by a person such as an observer, a computer or the like checks a dangerous water level (for example, refer to PTLs 1 and 2).

A water level measuring device described in PTL 1 cuts a predetermined monitoring region in an image of a monitoring camera as an identification image, identifies a water region and a non-water region in the cut image, and calculates a water level.

A water level measuring device described in PTL 2 detects inclination of a water measuring plate in an image, corrects a water surface in the image by using the detected inclination, and measures a water level based on the water measuring plate and the water level in the corrected image.

CITATION LIST

Patent Literature

[PTL 1] JP 6125137 B1
[PTL 2] JP 2001-281046 A

SUMMARY OF INVENTION

Technical Problem

In both cases of the monitoring by the observer and the monitoring by the computer, the use of an appropriate monitoring region improves accuracy of monitoring. For example, when a region with high visibility by the observer is used as the monitoring region, a possibility of overlooking by the observer or the like can be reduced. The use of the region with high visibility is particularly effective in a case where the images switched at the short intervals are checked.

In this way, it is important to determine whether the region used for monitoring is appropriate for a predetermined determination condition.

The water level measuring device described in PTL 1 determines a water level in a set monitoring region. However, PTL 1 does not disclose information used to set an appropriate monitoring region. That is, the water level measuring device described in PTL 1 has had a problem in that the water level measuring device cannot determine whether the set region is appropriate. For example, in a case where the water level measuring device described in PTL 1 is used, it has been necessary for the observer to determine whether a region set based on information regarding flooding that has occurred in advance is appropriate in the setting of the monitoring region. Therefore, trial and error or the like have been required for the observer.

The water level measuring device described in PTL 2 needs an object to be a reference such as the water measuring plate in the image for monitoring. Therefore, the water level measuring device described in PTL 2 has had a problem in that an image of a monitoring camera that can be applied is limited to an image including an object to be a predetermined reference. The water level measuring device described in PTL 2 does not determine the region itself. That is, the water level measuring device described in PTL 2 has had a problem in that the water level measuring device cannot determine whether the set region is appropriate.

An object of the present invention is to provide a region determining device that solves the above problems and determines a region without requiring an object to be a reference.

Solution to Problem

A region determining device according to one form of the present invention includes a likelihood calculating unit that calculates a likelihood of wetness of a pixel in an image including a plurality of frames, a non-water pixel measuring unit that measures the number of non-water pixels in which the likelihood falls within a first non-water range in any one of determination regions to be determined in the respective frames, a boundary pixel measuring unit that measures the number of boundary pixels in which the likelihood falls within a first water range in any one of the determination regions and the likelihood falls within a second non-water range in any one of the determination regions, and a region determining unit that determines whether the determination region satisfies a predetermined determination condition based on the number of non-water pixels and the number of boundary pixels.

A monitoring system according to one form of the present invention includes a monitoring camera that captures the image, and the region determining device, and a warning device that determines whether the determination region in the image is used for determination of a warning based on a result determined by the region determining device.

A region determining method according to one form of the present invention includes calculating a likelihood of wetness of a pixel in an image including a plurality of frames, measuring the number of non-water pixels in which the likelihood falls within a first non-water range in any one of determination regions to be determined in the respective frames, measuring the number of boundary pixels in which the likelihood falls within a first water range in any one of the determination regions and the likelihood falls within a second non-water range in any one of the determination regions, and determining whether the determination region satisfies a predetermined determination condition based on the number of non-water pixels and the number of boundary pixels.

A recording medium, according to one form of the present invention, for recording a program for causing a computer to execute processing for calculating a likelihood of wetness of a pixel in an image including a plurality of frames, processing for measuring the number of non-water pixels in which the likelihood falls within a first non-water range in any one of determination regions to be determined in the respective frames, processing for measuring the number of boundary pixels in which the likelihood falls within a first water range in any one of the determination regions and the likelihood falls within a second non-water range in any one of the determination regions, and processing for determining whether the determination region satisfies a predetermined determination condition based on the number of non-water pixels and the number of boundary pixels.

Advantageous Effects of Invention

An effect for determining a region without requiring an object to be a reference can be achieved based on the present invention.

BRIEF DESCRIPTION OF DRAWINGS

FIG. 9 is a block diagram illustrating a configuration of an information processing apparatus that is an example of a hardware configuration of the region determining device.

FIG. 10 is a block diagram illustrating an example of a monitoring system including the region determining device.

FIG. 11 is a block diagram illustrating an example of an outline of the monitoring system.

EXAMPLE EMBODIMENT

Figure 1:
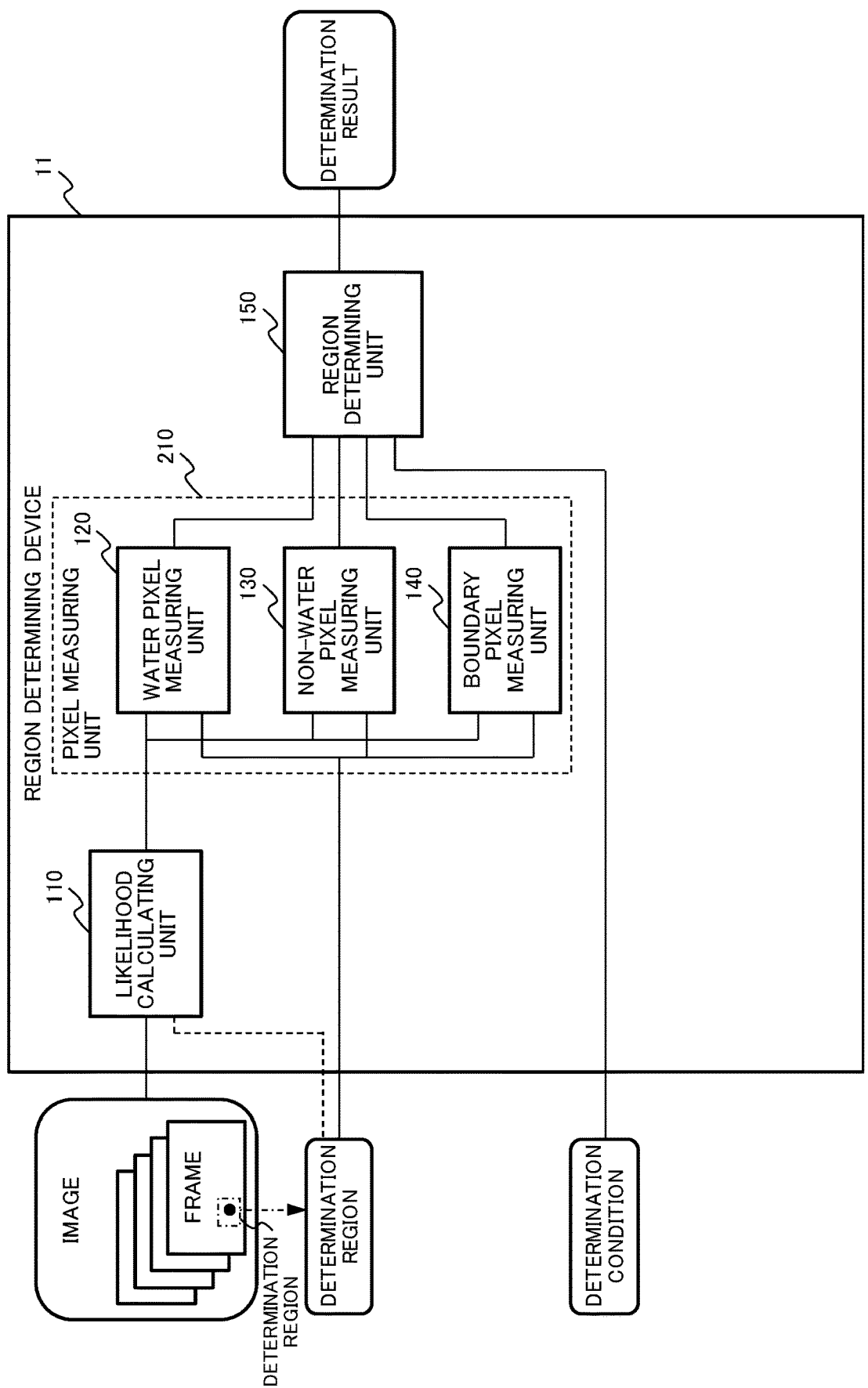
FIG. 1 is a block diagram illustrating an example of a configuration of a region determining device according to a first example embodiment.

Next, example embodiments of the present invention will be described with reference to the drawings.

Note that each drawing is used to explain the example embodiments of the present invention. However, the present invention is not limited to the illustration in each drawing. The similar components in the drawings are denoted with the same numeral, and the repetitive description thereof may be omitted. In the drawings used in the following description, description and illustration of a configuration of a part that is not related to the description of the present invention may be omitted.

Terms used in the description in the following example embodiments are summarized.

An "image" to be processed includes a plurality of still images (hereinafter, referred to as "frame") captured at predetermined intervals. For example, the image is a moving image obtained by imaging a monitoring target at predetermined intervals (for example, every second). A specific example of an image to be processed is a moving image of a river imaged by a monitoring camera that is provided to monitor rise of the river.

The interval between the frames is not limited to be constant and may have a plurality of values or may change depending on a time period or season.

For example, the plurality of frames included in the image may be frames imaged under different external environments such as the time period, the seasons, or the weather. In a case where a large number of frames under different external environments are used, each example embodiment can reduce an effect of disturbances. The "disturbance" includes variation in illumination light (sunlight or street lamp), a shadow of an object, a state of the water surface (for example, wave surface), a seasonal change, effects of vegetation, or the like.

A "likelihood" is a "likelihood of wetness (hereinafter, referred to as "water likelihood") in each pixel. However, a likelihood used in each example embodiment is not limited to this. For example, when one is subtracted from the value of the "water likelihood", the value becomes a "likelihood of non-wetness (hereinafter, referred to as "non-water likelihood")". In a case where the non-water likelihood is used in each example embodiment, in the following description, it is preferable that determination regarding the water likelihood be read as determination regarding the non-water likelihood. For example, a condition such that "equal to or more than a predetermined threshold for the water likelihood" is a condition such that "less than the predetermined threshold for the non-water likelihood".

A "non-water pixel" is a pixel that is assumed as a non-water pixel based on the likelihood. In other words, the non-water pixel is a pixel having a low water likelihood (pixel having high non-water likelihood). Specifically, the non-water pixel is a pixel in which a likelihood falls within a predetermined non-wetness range (hereinafter, referred to as "first non-water range") in equal to or more than a predetermined number (hereinafter, referred to as "first number of frames") of frames. For example, in the non-water pixel, the water likelihood is less than the predetermined threshold (hereinafter, referred to as "first threshold") in frames equal to or more than the first number of frames. For example, in a case where an image includes 100 frames, the non-water pixel has the water likelihood of less than 0.1 in equal to or more than 90 frames. However, the first number of frames is not limited. In the non-water pixel, it is sufficient that the likelihood fall within the first non-water range in any one of the frames.

A "boundary pixel" is a pixel that is assumed as a pixel that changes into water and non-water based on the likelihood, as a pixel at a boundary between water and non-water (for example, water level or water surface). In other words, the boundary pixel is a pixel having a relatively large number of frames having a high water likelihood and frames having a low water likelihood (high non-water likelihood). Specifically, the boundary pixel is a pixel in which a likelihood falls within a predetermined wetness range (hereinafter, referred to as "first water range") in equal to or more than a predetermined number (hereinafter, referred to as "second number of frames") of frames. Moreover, the boundary pixel is a pixel in which a likelihood falls within a predetermined non-wetness range (hereinafter, referred to as "second non-water range") in equal to or more than a predetermined number (hereinafter, referred to as "third number of frames") of frames. For example, in the boundary pixel, the water likelihood is equal to or more than a predetermined threshold (hereinafter, referred to as "second threshold") in equal to or more than the second number of frames and the water likelihood is less than a predetermined threshold (hereinafter, referred to as "third threshold") in equal to or more than the third number of frames. For example, in a case where an image includes 100 frames, in the boundary pixel, the water likelihood is equal to or more than 0.9 in equal to or more than 40 frames, and the water likelihood is less than 0.1 in equal to or more than 40 other frames. However, the second number of frames and the third number of frames are not limited. In the boundary pixel, it is sufficient that the likelihood fall within the first water range in any one of the frames and the likelihood fall within the second non-water range in any one of the frames.

A "water pixel" is a pixel that is assumed as a water pixel based on the likelihood. In other words, the water pixel is a pixel having a high water likelihood (low non-water likelihood). Specifically, the water pixel is a pixel in which a likelihood falls within a predetermined wetness range (hereinafter, referred to as "second water range") in equal to or more than a predetermined number (hereinafter, referred to as "fourth number of frames") of frames. For example, in the water pixel, the water likelihood is equal to or more than a predetermined threshold (hereinafter, referred to as "fourth threshold") in frames equal to or more than the fourth number of frames. For example, in a case where an image includes 100 frames, the water pixel has the water likelihood of equal to or more than 0.9 in equal to or more than 90 frames. However, the fourth number of frames is not limited. In the water pixel, it is sufficient that the likelihood fall within the second water range in any one of the frames.

The numbers of frames (first to fourth number of frames) used for the determination of the "water pixel", the "non-water pixel", and the "boundary pixel" may be the same, or some or all of the numbers may be different. The "first non-water range" may be the same as or different from the "second non-water range". The "first water range" may be the same as or different from the "second water range". Alternatively, the first to fourth thresholds may be the same, or some or all of the thresholds may be different.

The "water pixel", the "non-water pixel", and the "boundary pixel" are not limited to the above.

For example, each pixel may be determined by using a value calculated from the likelihoods in the plurality of frames (for example, average value of likelihood). For example, in a case where the image includes 100 frames, the water pixel may be a pixel in which the number of groups in which an average value of the likelihoods of the group for each 10 frames from the beginning is equal to or more than 0.9 is equal to or more than nine.

The first to fourth numbers of frames and the first to fourth thresholds (or first non-water range, second non-water range, first water range, and second water range) are values that are set in advance in each example embodiment. Alternatively, these values may be acquired when the image or the like is acquired in each example embodiment.

Alternatively, the threshold (or range) used to determine each of the "water pixel", the "non-water pixel" and/or the "boundary pixel" may be set based on the image. For example, each of the thresholds may be a value calculated based on an average value and a standard deviation of the likelihoods in the entire image of in an entire predetermined region.

Alternatively, the threshold (or range) may be set for each frame. For example, each of the thresholds may be a value calculated based on an average value and a standard deviation of the likelihoods of the pixels in each frame.

First Example Embodiment

Hereinafter, a region determining device 11 according to a first example embodiment of the present invention will be described with reference to the drawings.

The region determining device 11 determines whether a region specified as a target of determination in an image (hereinafter, referred to as "determination region") satisfies a predetermined condition (hereinafter, referred to as "determination condition"). The region determining device 11 acquires an image to be processed, the determination region, and the determination condition from an external device which is not illustrated. Alternatively, the region determining device 11 may operate by using the image, the determination region, and the determination condition that are held in a storage unit or the like (not illustrated) in advance.

The determination condition is not limited. It is sufficient that the determination condition be determined in accordance with an object to use the determination region. For example, in a case where the determination region is a region used to monitor a water level when the water level rises, it is desirable that the determination region be a "region including a water region, a non-water region, and a boundary region each of which has a size equal to or more than a predetermined size". Therefore, an example of the determination condition in this case is that "the determination region includes the water pixel, the non-water pixel, and the boundary pixel of which the numbers are equal to or more than respectively specified values.

The determination condition is not limited to a single condition and may include a plurality of conditions. For example, it is desirable that the region used to determine the water level be that "the water region and the non-water region are clearly distinguished from each other" in addition to that "the region includes the water region, the non-water region, and the boundary region each of which has the size equal to or more than the predetermined size". Therefore, for example, the determination condition in this case may include two conditions indicated below.

Condition 1: Each of the number of water pixels, the number of non-water pixels, and the number of boundary pixels is equal to or more than the number set for each.

Condition 2: An absolute value of a difference between an average value of the likelihood of the water pixel and an average value of the likelihood of the non-water pixel is equal to or more than a predetermined threshold.

The shape and the size of the determination region are not limited. The shape of the determination region may be, for example, a triangle, a rectangle, a polygon, a circle, or an ellipse. Alternatively, the shape of the determination region is not limited to a projected shape such as a regular polygon and may be a shape having a notch. Alternatively, the determination region may be a combination of the above shapes.

[Description of Configuration]

First, a configuration of the region determining device 11 according to the first example embodiment will be described with reference to the drawings.

FIG. 1 is a block diagram illustrating an example of the configuration of the region determining device 11 according to the first example embodiment.

The region determining device 11 includes a likelihood calculating unit 110, a water pixel measuring unit 120, a non-water pixel measuring unit 130, a boundary pixel measuring unit 140, and a region determining unit 150.

The likelihood calculating unit 110 calculates a water likelihood for each pixel. Alternatively, the likelihood calculating unit 110 may calculate a non-water likelihood for each pixel. In the following description, for example, the likelihood is assumed as the water likelihood. That is, in a case of the most water-like pixel, the likelihood of the pixel is "1". Conversely, in a case of the least water-like pixel (case of most non-water-like pixel), the likelihood of the pixel is "0". The likelihood of other pixel is a value between zero to one.

A method for calculating the likelihood by the likelihood calculating unit 110 is not limited. An example of the method for calculating the likelihood will be described.

(1) Deep Learning Based

The likelihood calculating unit 110 constructs a neural network that has learned calculation of the water likelihood (or non-water likelihood) by inputting a river image (image including water pixel and non-water pixel) in advance by using semantic segmentation. Then, the likelihood calculating unit 110 calculates a water likelihood (or non-water likelihood) for each pixel in a frame to be determined by using the neural network after learning.

(2) Machine Learning Based

The likelihood calculating unit 110 extracts a feature amount regarding a color or an edge from an image set of an image region including only water pixels and an image set of an image region including only non-water pixels which are prepared in advance. The likelihood calculating unit 110 may use a general method (for example, Hue Saturation Brightness histogram or edge histogram) as the method for extracting the feature amount. Then, the likelihood calculating unit 110 learns a support vector machine that discriminates water and non-water in such a way as to achieve two-class calculation (classification into water and non-water) by using the extracted feature amount. Then, the likelihood calculating unit 110 calculates a water likelihood (or non-water likelihood) based on the discrimination result of the pixel by using the learned support vector machine.

A unit used to calculate the likelihood not limited to the pixel. The likelihood calculating unit 110 may calculate a likelihood for a predetermined pixel range.

Moreover, the likelihood calculating unit 110 may perform image correction on the image before calculating the likelihood in order to enhance accuracy for calculating the water likelihood (or non-water likelihood). The image correction is not limited. For example, the image correction is correction for sharpening an unsharp image. Specifically, the likelihood calculating unit 110 may use correction (dehaze) for sharpening an image of which the sharpness is lowered due to an effect of nighttime, haze, or the like or correction (noise reduction) for removing noises.

The likelihood calculating unit 110 may calculate the likelihood for all the pixels included in the image. Alternatively, the likelihood calculating unit 110 may calculate the likelihood for the pixels in the determination region.

The water pixel measuring unit 120 measures the number of water pixels included in the determination region.

The non-water pixel measuring unit 130 measures the number of non-water pixels included in the determination region.

The boundary pixel measuring unit 140 measures the number of boundary pixels included in the determination region.

The water pixel measuring unit 120, the non-water pixel measuring unit 130, and the boundary pixel measuring unit 140 may sequentially operate. At that time, an order of the operations of the water pixel measuring unit 120, the non-water pixel measuring unit 130, and the boundary pixel measuring unit 140 is not limited. Any one of the water pixel measuring unit 120, the non-water pixel measuring unit 130, and the boundary pixel measuring unit 140 may start to operate. Alternatively, the water pixel measuring unit 120, the non-water pixel measuring unit 130, and the boundary pixel measuring unit 140 may concurrently perform at least a part of the operation in parallel.

Alternatively, one configuration may perform the measurement by two or more of the water pixel measuring unit 120, the non-water pixel measuring unit 130, and the boundary pixel measuring unit 140.

For example, a pixel measuring unit 210 indicated by a broken line in FIG. 1 is an example of a configuration that measures the number of water pixels, the number of non-water pixels, and the number of boundary pixels as a single configuration.

In a case where the water pixel measuring unit 120, the non-water pixel measuring unit 130, and the boundary pixel measuring unit 140 are separately configured, each measuring unit acquires the likelihood calculated for the pixel. That is, the likelihood calculated for the pixel is read three times.

On the other hand, in a case where the pixel measuring unit 210 measures the number of pixels, it is sufficient for the pixel measuring unit 210 to read the likelihood calculated for the pixel once. In this case, the likelihood calculated for the pixel is read once.

In this way, in a case where the single configuration (for example, pixel measuring unit 210) measures the water pixels, the non-water pixels, and the boundary pixels, the region determining device 11 can reduce the number of times of likelihood reading processing.

The region determining unit 150 determines whether the determination region satisfies the determination condition based on the number of water pixels, the number of non-water pixels, and the number of boundary pixels.

The region determining unit 150 outputs the determination result. For example, the region determining unit 150 may transmit the determination result to a device that has specified the determination region.

The region determining unit 150 may use a predetermined model for the determination of the region.

In a region used to determine a risk when the water level rises, it is sufficient to determine an increase in a water level from a normal water level (rise of water level). Therefore, it is sufficient that the region used to determine the risk when the water level rises include a region at the boundary between water and non-water (region of boundary pixel) and a non-water region (region of non-water pixel). In a case where the region determining device 11 uses such a region, the region determining device 11 does not need to include the water pixel measuring unit 120. In this case, the region determining unit 150 determines whether the determination region satisfies the determination condition based on the number of non-water pixels and the number of boundary pixels.

Moreover, the determination by the region determining device 11 is not limited to determination made by using a pixel in an image obtained by imaging the same position (pixel with same angle of view and at same position).

For example, the region determining device 11 may determine the determination region by using images having different angles of view and including the same subject. The images having different fields of view may be single images captured with different angles of view or may be a plurality of images captured with different angles of view.

An example of the operation in this case will be described.

First, the region determining device 11 detects a subject that is included in all the frames and that does not move.

Then, the region determining device 11 performs matching between the frames based on the subject. For example, the region determining device 11 calculates a rule for converting pixel positions between the frames.

Then, the region determining device 11 determines the position of the determination region in each frame based on the matching result. For example, the region determining device 11 determines, based on the position of the determination region specified in a certain frame and the conversion rule, a position of the determination region in another frame and a corresponding pixel. Then, it is sufficient that the region determining device 11 perform determination by using the pixel in the determination region in each frame.

[Description of Operation]

Next, the operation of the region determining device 11 according to the first example embodiment will be described with reference to the drawings.

Figure 2:
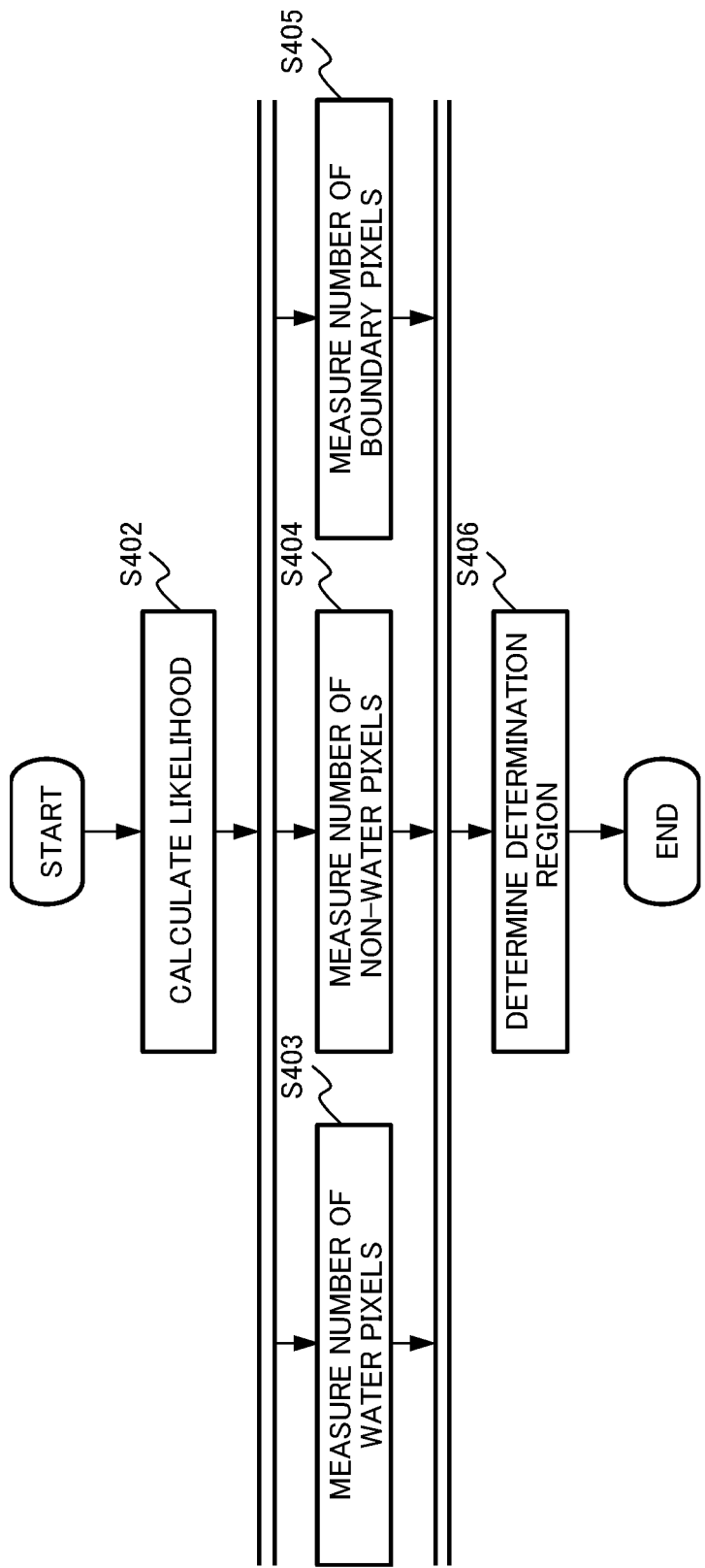
FIG. 2 is a flowchart illustrating an example of an operation of the region determining device according to the first example embodiment.

FIG. 2 is a flowchart illustrating an example of the operation of the region determining device 11 according to the first example embodiment.

First, the likelihood calculating unit 110 calculates the likelihoods of all the pixels in the entire image or the determination region (step S402).

The water pixel measuring unit 120 measures the number of water pixels in the determination region (step S403).

The non-water pixel measuring unit 130 measures the number of non-water pixels in the determination region (step S404).

The boundary pixel measuring unit 140 measures the number of boundary pixels in the determination region (step S405).

The water pixel measuring unit 120, the non-water pixel measuring unit 130, and the boundary pixel measuring unit 140 may sequentially operate. Alternatively, the water pixel measuring unit 120, the non-water pixel measuring unit 130, and the boundary pixel measuring unit 140 may perform at least a part of the operation in parallel. The order of the operations of the water pixel measuring unit 120, the non-water pixel measuring unit 130, and the boundary pixel measuring unit 140 may be switched.

Then, the region determining unit 150 determines whether the determination region satisfies the determination condition based on the measurement result (step S406).

The region determining unit 150 outputs the determination result to a predetermined device or the like.

[Description of Effect]

Next, an effect of the region determining device 11 according to the first example embodiment will be described.

The region determining device 11 can achieve an effect for determining the region without requiring an object to be a reference.

The reasons are as follows.

The region determining device 11 includes the likelihood calculating unit 110, the non-water pixel measuring unit 130, the boundary pixel measuring unit 140, and the region determining unit 150. The likelihood calculating unit 110 calculates a likelihood of wetness of a pixel in an image including a plurality of frames. The non-water pixel measuring unit 130 measures the number of non-water pixels in which the likelihood falls within the first non-water range in any one of the determination regions to be determined in each frame. The boundary pixel measuring unit 140 measures the number of boundary pixels in which the likelihood falls within the first water range in any one of the determination regions and the likelihood falls within the second non-water range in any one of the determination regions. The region determining unit 150 determines whether the determination region satisfies a predetermined determination condition based on the number of non-water pixels and the number of boundary pixels.

The region in which the water level is determined needs to include at least a region of the water surface (region at boundary between water and non-water) and a region in which the water level increases (non-water region).

Therefore, the region determining device 11 according to the first example embodiment determines whether the determination region satisfies the determination condition as follows. First, the likelihood calculating unit 110 calculates the likelihood (for example, water likelihood) of the pixel in the image. Then, the non-water pixel measuring unit 130 measures the number of non-water pixels based on the calculated likelihood in the determination region. Moreover, the boundary pixel measuring unit 140 measures the number of boundary pixels in the determination region. Then, the region determining unit 150 determines whether the number of non-water pixels and the number of boundary pixels satisfy the determination condition in the determination region. For example, the region determining unit 150 determines whether the determination region includes the non-water pixels and the boundary pixels of which the number is equal to or more than a predetermined number.

The region determining device 11 determines a region by using the likelihood of the pixel. More specifically, the region determining device 11 calculates the number of non-water pixels and the number of boundary pixels based on the likelihood and determines whether the determination region satisfies the determination condition by using the number of non-water pixels and the number of boundary pixels. In this determination, the region determining device 11 does not need the object to be the reference in the region. In this way, the region determining device 11 can determine the determination region without requiring the object to be the reference.

Moreover, the region determining device 11 includes the water pixel measuring unit 120. In general, in the non-water region, objects are placed or removed. In the non-water region, plants grow or die. The non-water region more widely varies than the water region. In other words, the likelihood of the water pixel is more stable than the likelihood of the non-water pixel.

The region determining unit 150 of the region determining device 11 can more stably determine the region by using the number of water pixels measured by the water pixel measuring unit 120.

Second Example Embodiment

The region determining device 11 according to the first example embodiment determines the region applied by an observer or the like. In a case where the first example embodiment is used, the observer selects the determination region and transmits the determination region to the region determining device 11 and can recognize whether the determination region satisfies a desired condition (determination condition) based on the determination result from the region determining device 11. However, in a case where the specified determination region does not satisfy the determination condition, the observer needs to search for another determination region. When the determination region that satisfies the condition (determination condition) desired by the observer can be provided to the observer, convenience for the observer is improved.

A region determining device 12 according to the second example embodiment acquires an image to be processed, a predetermined rule for setting a region (hereinafter, referred to as "setting rule"), and a determination condition from an external device which is not illustrated. Alternatively, the region determining device 12 may operate by using the image, the setting rule, and the determination condition that are held in a storage unit or the like (not illustrated) in advance.

Then, the region determining device 12 sets the determination region in the image based on the setting rule and determines whether the set determination region satisfies the determination condition. In a case where the set determination region does not satisfy the determination condition, the region determining device 12 sets another determination region by using the setting rule. The region determining device 12 repeats the similar operation until the set determination region satisfies the determination condition. In a case where the set determination region satisfies the determination condition, the region determining device 12 outputs the determination region.

The setting rule is not limited. For example, the setting rule is the shape and the size of the determination region.

The setting rule may include a predetermined rule regarding a change of the determination region (hereinafter, referred to as "change rule"). The change rule is not limited. For example, the change rule is an increase amount in the size (for example, width and height) of the determination region and/or a moving amount for moving the determination region.

Moreover, the setting rule may include a condition that satisfies the set determination region (hereinafter, referred to as "setting condition"). The setting condition is not limited. For example, the setting condition is a change amount of a luminance of the pixel in the determination region or a length of an edge included in the determination region.

Moreover, the region determining device 12 may set a plurality of determination regions based on the setting rule including the change rule, select one or a plurality of determination regions that satisfies the determination condition from among the plurality of determination regions using the determination result for each determination region, and output the selected determination region.

Next, the region determining device 12 according to the second example embodiment will be described with reference to the drawings.

[Description of Configuration]

First, a configuration of the region determining device 12 according to the second example embodiment will be described with reference to the drawings.

Figure 3:
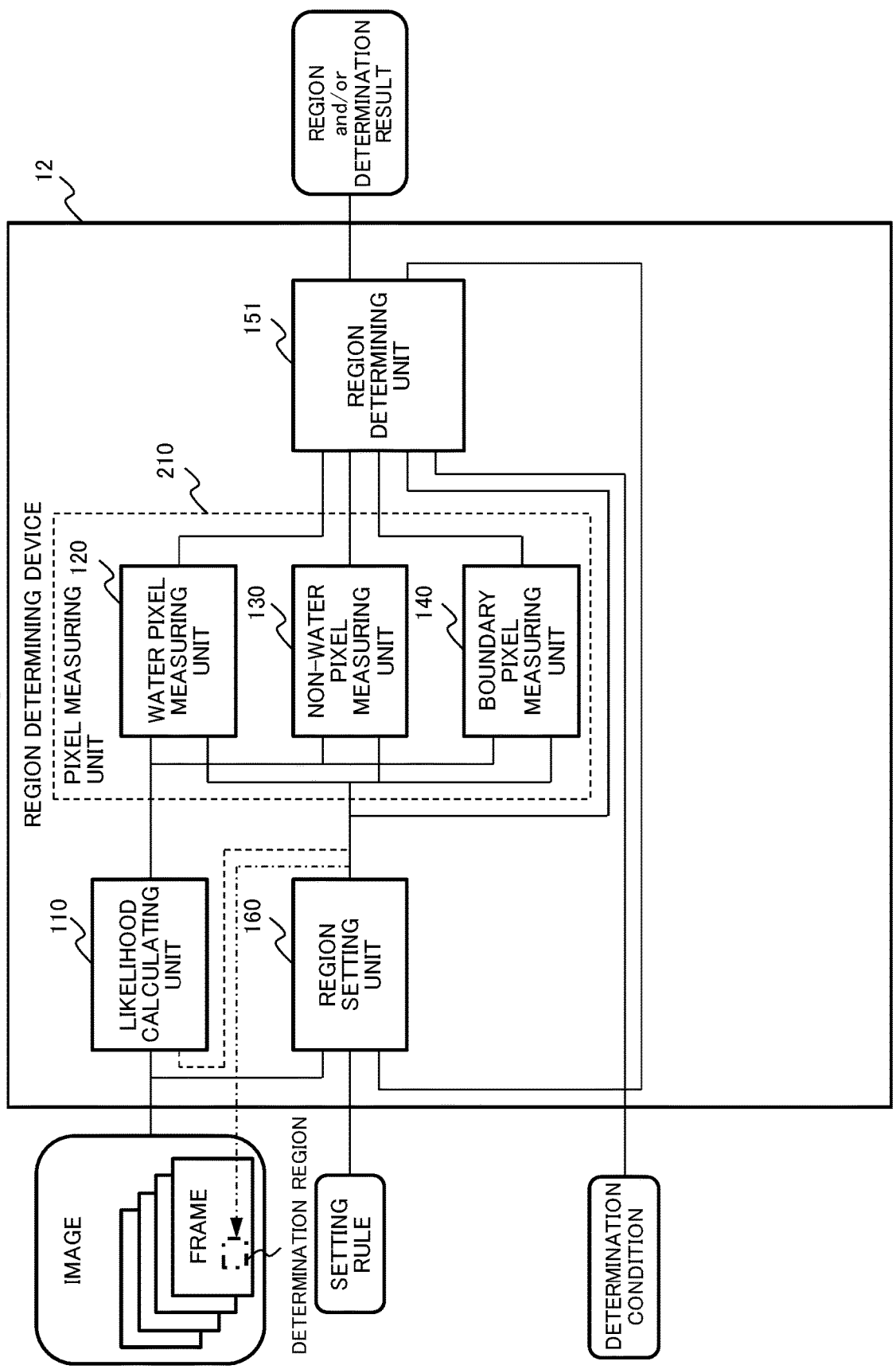
FIG. 3 is a block diagram illustrating an example of a configuration of a region determining device according to a second example embodiment.

FIG. 3 is a block diagram illustrating an example of the configuration of the region determining device 12 according to the second example embodiment.

The region determining device 12 includes a region determining unit 151 instead of the region determining unit 150, in comparison with the configuration of the region determining device 11 according to the first example embodiment. Moreover, the region determining device 12 includes a region setting unit 160. Detailed description of the component similar to that in the first example embodiment is appropriately omitted, and a specific configuration of the region determining device 12 according to the second example embodiment will be described.

The region setting unit 160 sets the determination region according to the setting rule. Then, the region setting unit 160 notifies the water pixel measuring unit 120, the non-water pixel measuring unit 130, the boundary pixel measuring unit 140, and the region determining unit 151 of the determination region set according to the setting rule.

A method for setting the determination region by the region setting unit 160 is not limited.

For example, the region setting unit 160 sets the determination region as follows.

The region setting unit 160 acquires the shape of the determination region (for example, height and width of rectangle) as the setting rule. Then, the region setting unit 160 randomly selects a position in the image. The region setting unit 160 sets the determination region at the selected position.

In a case where the setting rule includes the setting condition, the region setting unit 160 sets the determination region as follows.

The region setting unit 160 acquires the shape of the determination region (for example, height and width of rectangle) and the setting condition (for example, lower limit of luminance width of pixel in determination region or lower limit of edge length in determination region) as the setting rule. Then, the region setting unit 160 randomly selects a position in the image. The region setting unit 160 sets the determination region at the selected position and determines whether the determination region satisfies the setting condition. In a case where the set determination region does not satisfy the setting condition, the region setting unit 160 randomly selects a next position and repeats the similar operation. In a case where the set determination region satisfies the setting condition, the region setting unit 160 sets the determination region at the position.

Alternatively, in a case where the setting rule includes the setting condition and the change rule, the region setting unit 160 sets the determination region as follows.

The region setting unit 160 acquires the size of the determination region (for example, height and width of rectangle), the change rule of the determination region (for example, increase amounts and upper limits of height and width), and the setting condition (for example, lower limit of luminance width in region). Then, the region setting unit 160 randomly selects a position in the image. The region setting unit 160 sets the determination region having the acquired size at the selected position and determines whether the determination region satisfies the setting condition. In a case where the set determination region does not satisfy the setting condition, the region setting unit 160 changes the determination region by using the change rule and determines whether the set determination region satisfies the setting condition. Until the determination region satisfies the determination condition, the region setting unit 160 repeats the similar operation while changing the determination region in accordance with the change rule. In a case where the set determination region does not satisfy the setting condition even when all the changes in accordance with the change rule are applied, the region setting unit 160 randomly selects a next position and repeats the similar operation. In a case where the set determination region satisfies the setting condition, the region setting unit 160 notifies each component of the determination region at that time.

In a case where the change rule includes a plurality of pieces of change content (for example, increase amount of size and moving amount) and an order of use of the change content is not specified, the region setting unit 160 does not limit the order of use of the plurality of pieces of change content. For example, in a case where the change rule includes the increase amount of size and the moving amount, the region setting unit 160 changes the size of the determination region at each position first. In a case where the determination region having any size does not satisfy the determination condition, the region setting unit 160 may change the position of the determination region. Alternatively, in a case where the position of the determination region is changed first and the determination region at any position does not satisfy the determination condition, the region setting unit 160 may change the size of the determination region.

The number of the determination regions is not limited to one, and the region setting unit 160 may set the plurality of determination regions at once. For example, the region setting unit 160 may set the plurality of determination regions according to the change rule.

Description will be made by using a specific example.

For example, it is assumed that a shape of each of the image and the determination region be a rectangle. Then, it is assumed that the region setting unit 160 acquire "the size of the determination region" and "movement by one pixel (as change rule)" as the setting rules. In this case, the region setting unit 160 may set the plurality of determination regions as follows.

First, the region setting unit 160 sets a determination region having the above size at the uppermost end of the leftmost end of the image. Next, the region setting unit 160 sets the determination region at a position moved rightward by one pixel. The region setting unit 160 sets the determination region while moving the determination region by one pixel until the determination region reaches the right end. When the determination region reaches the right end, the region setting unit 160 sets the determination region at a position moved downward by one pixel at the left end. Then, similarly, the region setting unit 160 sets the determination regions obtained by moving the determination region by one pixel from the left end to the right end. Hereinafter, the region setting unit 160 repeats the similar operation and sets the determination region to the determination region on the rightmost end of the lowermost end.

In a case where the region setting unit 160 moves the determination region by one pixel, the region setting unit 160 sets the determination region in which the largest number of determination regions are overlapped. On the other hand, in a case where the region setting unit 160 moves the determination region by using a value equal to or more than the width of the determination region as the moving amount in the horizontal direction and a value equal to or more than the height of the determination region as the moving amount in the vertical direction, the region setting unit 160 sets the determination region that does not overlap.

Similarly to the region determining unit 150, the region determining unit 151 determines the determination region based on the number of water pixels, the number of non-water pixels, and the number of boundary pixels. Moreover, the region determining unit 151 outputs the determination region that satisfies the determination condition. For example, the region determining unit 151 outputs the determination region to a device which is not illustrated (for example, device that has sent setting rule and determination condition). Alternatively, the region determining unit 151 may display the determination region on a display device which is not illustrated.

The region determining device 12 may process the determination regions one by one. An example of the operation in this case will be described.

The region setting unit 160 sets a single determination region according to the setting rule. The water pixel measuring unit 120, the non-water pixel measuring unit 130, and the boundary pixel measuring unit 140 measure pixels in the determination region. Then, the region determining unit 151 determines the determination region based on the determination condition. In a case where the determination region does not satisfy the determination condition, the region determining unit 151 instructs the region setting unit 160 to set a next determination region. The region determining device 12 repeats the above operation until the determination region satisfies the determination condition. In a case where the determination region satisfies the determination condition, the region determining unit 151 outputs the determination region that satisfies the determination condition.

The region determining device 12 may collectively process the plurality of determination regions. An example of the operation in this case will be described.

The region setting unit 160 sets the plurality of determination regions according to the setting rule. The water pixel measuring unit 120, the non-water pixel measuring unit 130, and the boundary pixel measuring unit 140 measure the pixels in each of the plurality of determination regions. The region determining unit 151 selects the determination region that satisfies the determination condition from among the plurality of determination regions and outputs the selected determination region.

The region determining device 12 may repeat the above operation for each set of the determination regions in a predetermined processing unit.

Information output by the region determining unit 151 as the determination region is not limited. For example, the region determining unit 151 may output information indicating the outer shape of the determination region. In a case where the shape of the determination region is a rectangle, an example of the information indicating the outer shape of the determination region includes "the position of the vertex (for example, vertex on upper left side on screen), the width, and the height". Alternatively, in a case where the determination region is a polygon, the information indicating the outer shape of the determination region includes, for example, coordinates of all the vertices.

The region determining unit 151 may select the determination region from among the plurality of determination regions by using a predetermined evaluation value. For example, the region determining unit 151 may output a single determination region having the highest predetermined evaluation value from among the determination regions that satisfy the determination condition. Alternatively, the region determining unit 151 may output a predetermined number of determination regions from the ones having the higher predetermined evaluation value or the plurality of determination regions having the predetermined evaluation value higher than a predetermined threshold, from among the determination regions that satisfy the determination condition.

The evaluation value used by the region determining unit 151 is not limited. For example, the region determining unit 151 may use an absolute value of a difference between an average value of the likelihood of the water pixel and an average value of the likelihood of the non-water pixel as the evaluation value.

A case is assumed where the evaluation values of the plurality of determination regions are substantially the same. Substantially the same is not limited to a case where the plurality of evaluation values completely coincides with each other. Substantially the same includes a case where a plurality of evaluation values is included in a range in which the evaluation values have substantially no difference in consideration of an error and/or a margin.

In a case where the evaluation values are substantially the same, the region determining unit 151 may select the determination region using additional information.

The additional information is not limited. For example, the region determining unit 151 may use features useful for determination by using the determination region as the additional information.

For example, in a case where a person determines the determination region, the region determining unit 151 may select a determination region in which a difference in contrast (difference in luminance, saturation, and/or hue) between the region of the water pixel and the region of the non-water pixel is large. Alternatively, the region determining unit 151 may select the determination region of which the pixel value falls within a predetermined range in order to avoid saturation of the pixel values.

Alternatively, in a case where a computer determines the determination region, the region determining unit 151 may select a determination region suitable for calculation by using a method used by the computer (for example, discrimination using model learned by using machine learning). For example, the region determining unit 151 may select a determination region that has a wide range of the pixel feature amount. Alternatively, the region determining unit 151 may select a determination region in which the difference between the average value of the likelihood of the water pixel and the average value of the likelihood of the non-water pixel is large and a standard deviation of each likelihood is small.

Alternatively, in a case where the evaluation values of the plurality of determination regions are substantially the same, the region determining unit 151 may select all the determination regions. Alternatively, the region determining unit 151 may select a single determination region or a part of the determination region by using a predetermined selection method (for example, round robin or pseudo-random number).

The region determining unit 151 may output the evaluation value or the like in addition to the determination region.

The region setting unit 160 and/or the region determining unit 151 may operate by using a predetermined model.

[Description of Operation]

Next, an operation of the region determining device 12 according to the second example embodiment will be described with reference to the drawings.

Figure 4:
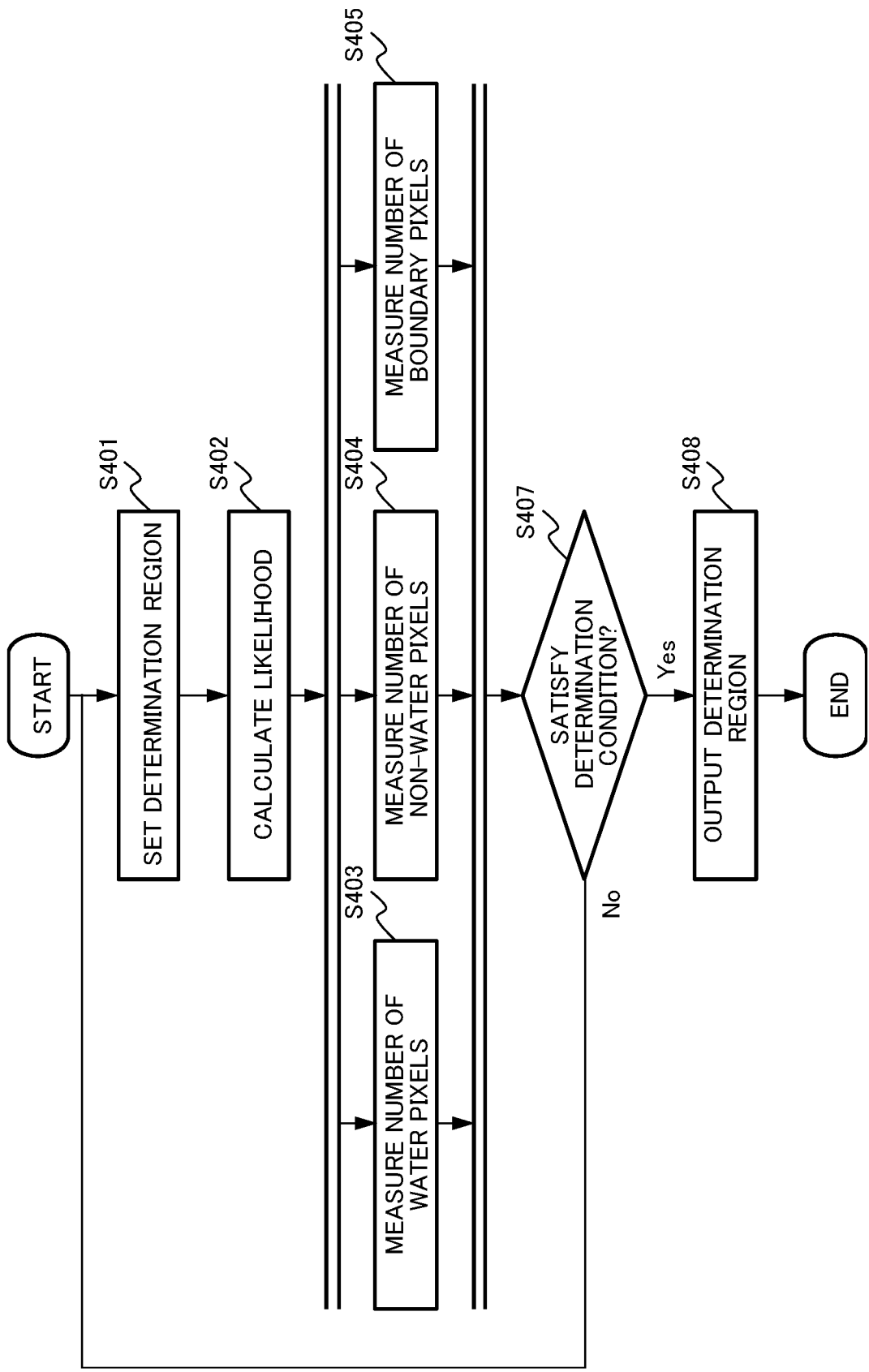
FIG. 4 is a flowchart illustrating an example of an operation of the region determining device according to the second example embodiment.

FIG. 4 is a flowchart illustrating an example of the operation of the region determining device 12 according to the second example embodiment.

Description of the operation similar to that in the first example embodiment is appropriately omitted, and a specific operation of the region determining device 12 according to the second example embodiment will be described.

The region setting unit 160 sets the determination region according to the setting rule (step S401).

In steps S402 to S405, the region determining device 12 operates similarly to the region determining device 11 according to the first example embodiment.

The region determining unit 151 determines whether the determination region satisfies the determination condition (step S407).

In a case where the determination region does not satisfy the determination condition (No in step S407), the region determining device 12 returns to step S401.

In a case where the determination region satisfies the determination condition (Yes in step S407), the region determining unit 151 outputs the determination region (step S408).

The region determining device 12 may process the plurality of determination regions at once. In this case, the region determining device 12 does not perform the operation in step S407 and operates as follows.

In step S401, the region setting unit 160 sets the plurality of determination regions.

In steps S402 to S405, the likelihood calculating unit 110, the water pixel measuring unit 120, the non-water pixel measuring unit 130, and the boundary pixel measuring unit 140 perform the operations on the plurality of determination regions.

Then, in step S408, the region determining unit 151 outputs the determination region that satisfies the determination condition from among the plurality of determination regions.

[Description of Effect]

Next, an effect of the region determining device 12 according to the second example embodiment will be described.

The region determining device 12 according to the second example embodiment can achieve an effect for reducing a work for setting the determination region by an observer or the like, in addition to the effect of the first example embodiment.

This is because the region determining device 12 outputs the determination region that satisfies the determination condition according to the specified setting rule. More specifically, this is because the region setting unit 160 repeats the setting of the determination region until the region determining unit 151 determines that the determination region satisfies the determination condition.

For example, the observer notifies the region determining device 12 of the setting rule with respect to an image saved in a predetermined storage device or the like and the determination condition. The region setting unit 160 sets the determination region according to the setting rule. The region determining unit 151 determines whether the set determination region satisfies the determination condition. In a case where the determination region does not satisfy the determination condition, the region determining unit 151 instructs the region setting unit 160 to set the determination region again. The region determining device 12 repeats the similar operation until the determination region set by the region setting unit 160 satisfies the determination condition. In a case where the determination region satisfies the determination condition, the region determining unit 151 outputs the determination region. Based on such an operation, the region determining device 12 outputs the determination region that satisfies the determination condition.

Moreover, the region setting unit 160 may set the plurality of determination regions. In this case, the region determining unit 151 outputs the determination regions that satisfy the determination condition among the plurality of determination regions.

Third Example Embodiment

The region determining device 12 according to the second example embodiment sets the determination region based on the setting rule and the determination condition. However, a case is assumed where the determination region that satisfies the setting rule and the determination condition includes a moving object such as a car. A position or the like of the moving object changes as time elapses. Therefore, in the region including the moving body, a change that is not related to a monitoring target (for example, river) occurs. It is better not to select such a region.

A region determining device 13 according to the third example embodiment sets a more appropriate determination region.

Next, the third example embodiment will be described with reference to the drawings.

[Description of Configuration]

A configuration of the region determining device 13 according to the third example embodiment will be described with reference to the drawings.

Figure 5:
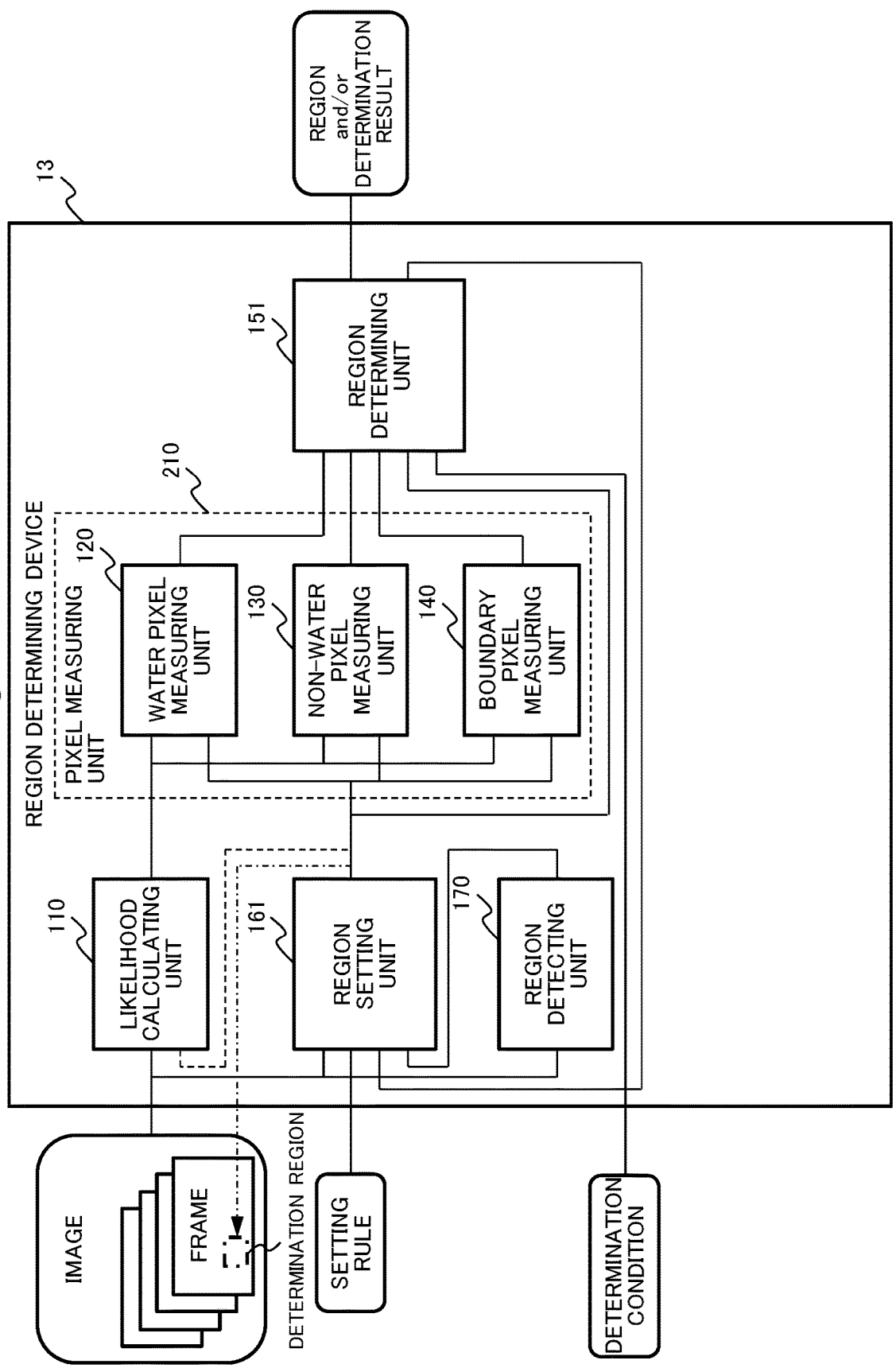
FIG. 5 is a block diagram illustrating an example of a configuration of a region determining device according to a third example embodiment.

FIG. 5 is a block diagram illustrating an example of the configuration of the region determining device 13 according to the third example embodiment.

The region determining device 13 includes a region setting unit 161 instead of the region setting unit 160, in comparison with the configuration of the region determining device 12 according to the second example embodiment. Moreover, the region determining device 13 includes a region detecting unit 170. Detailed description of the component similar to that in the second example embodiment is appropriately omitted, and a specific configuration of the region determining device 13 according to the third example embodiment will be described.

The region detecting unit 170 detects a region, in an image, to be referred when the region setting unit 161 sets the determination region and notifies the region setting unit 161 of the detected region.

For example, the region detecting unit 170 detects a region, in an image, that is better to avoid to be included in the determination region (hereinafter, referred to as "unrecommended region"). The unrecommended region is, for example, a region (for example, place near tree, course, or road) including a moving object (for example, float, ship, pedestrian, or automobile) or a region including an object of which an appearance or a shape changes (for example, region with high vegetation). Alternatively, such as a region in a shadow of an object, the unrecommended region is a region that is easily affected by time, the season, the weather, or the like.

In a case where the region detecting unit 170 detects the unrecommended region, it is desirable for the region setting unit 161 to set the determination region that does not include the unrecommended region. However, for example, a region around a pier is a region where ships that are moving objects come and go and is also a region of which a water level is to be determined. In this case, it is desirable that the region setting unit 161 set a determination region including the region around the pier. In this way, even in the region determined as the unrecommended region, there is a region that is better to be included in the determination region depending on a relationship with surroundings. Therefore, it is sufficient for the region setting unit 161 to set the determination region in such a way that the unrecommended region is included in a necessary region or that the unrecommended region is not included in a possible region. That is, the region setting unit 161 refers to the unrecommended region detected by the region detecting unit 170 and sets the determination region.

Alternatively, the region detecting unit 170 may detect a region that is better to be included in the determination region (hereinafter, referred to as "recommended region"). The recommended region is, for example, an asphalt region. Asphalt has a fixed structure and makes it easier to clearly determine the boundary between water and non-water. The recommended region may be a region that satisfies a predetermined condition (for example, dangerous line at the time when water level rises).

In a case where the region detecting unit 170 detects the recommended region, it is sufficient for the region setting unit 161 to set the determination region in such a way that the recommended region detected by the region detecting unit 170 is included in a possible range or the recommended region is included in a necessary range. That is, the region setting unit 161 refers to the recommended region detected by the region detecting unit 170 and sets the determination region.

The region detecting unit 170 may detect both of the unrecommended region and the recommended region. In this case, the region setting unit 161 refers to the unrecommended region and/or the recommended region detected by the region detecting unit 170 and sets the determination region.

Moreover, the region detecting unit 170 may detect the unrecommended region and/or the recommended region by using reliability for the likelihood.

For example, there is a high possibility that pixels with a high luminance or low luminance are saturated. Therefore, the region detecting unit 170 sets low reliability to the pixels having the high luminance or the low luminance and sets high reliability to the pixels having a medium luminance. Then, the region detecting unit 170 detects the recommended region and/or the unrecommended region based on the reliability. For example, a region in which a ratio of the pixels with low reliability is high is an example of the unrecommended region. A region in which a ratio of the pixels with high reliability is high is an example of the recommended region. Based on the above operation, the region detecting unit 170 can detect a region other than the pixel with high possibility of saturation.

However, a method for calculating the reliability is not limited to the above. For example, the region detecting unit 170 may detect a moving body included in a frame (for example, person, car, and/or ship) by using a template or the like. Then, the region detecting unit 170 may set low reliability to the pixel of the moving body and may set high reliability to a pixel of a fixed object.

The region detecting unit 170 may use a plurality of frames to calculate the reliability. For example, the region detecting unit 170 may detect the moving body by using the plurality of frames.

Alternatively, the region detecting unit 170 may use a luminance change and/or a color change in the pixel generated as time elapses. For example, the region detecting unit 170 may set high reliability to a pixel of which the change is small as time elapses and may set low reliability to a pixel of which the change is large, as the reliability of the pixel.

Alternatively, the region detecting unit 170 may use an average value of the reliabilities of a predetermined number of frames as the reliability.

Alternatively, the region detecting unit 170 may use features of the image to calculate the reliability. For example, it is assumed that an image include a region of which the image features largely change (for example, texture region) and a region of which the image features are constant (flat region). A case is assumed where a surface shape of the texture region is complicated. Such a region having the complicated shape is easily affected by disturbance. In a case where the texture region is estimated to have a complicated shape, the region detecting unit 170 may set high reliability to the flat region and may set low reliability to the texture region.

However, there is a case where the texture region is a region having high reliability. For example, a tiled embankment is the texture region and the structure of the embankment is fixed. In this case, the region detecting unit 170 may set high reliability to the texture region. The texture region is a repetition of the regions having similar features. Then, the region detecting unit 170 may select one of unit regions having the similar features and calculate reliability, and may set the similar reliability to the other unit regions. In this case, the region detecting unit 170 can reduce a load necessary for calculating the reliability.

The region setting unit 161 operates similarly to the region setting unit 160 other than that the region setting unit 161 refers to a region detected by the region detecting unit 170 (unrecommended region and/or recommended region).

[Description of Effect]

Next, an effect of the region determining device 13 according to the third example embodiment will be described.

The region determining device 13 according to the third example embodiment can achieve an effect for setting a more appropriate determination region, in addition to the effect of the region determining device 12 according to the second example embodiment.

The reasons are as follows.

The region detecting unit 170 detects a region that is better not to be included in a determination region to be set and/or a region that is better not to be included in a region to be set. The region setting unit 161 refers to the region detected by the region detecting unit 170 and sets the determination region. Based on such an operation, the region determining device 13 can set a more appropriate determination region.

Fourth Example Embodiment

The determination region set by the region determining device 12 according to the second example embodiment is used for predetermined detection. For example, the determination region is used to detect whether a water level has reached a height (dangerous line) at which a warning is issued at the time when the water level rises. In this case, it is desirable that a region used for actual determination include the region used for the detection (for example, dangerous line). However, the region used for the detection is not necessarily included in a region that satisfies a determination condition most. There is a case where the determination region set by the region determining device 12 does not include the region used for the detection.

A region determining device 14 according to the fourth example embodiment adds a predetermined region (for example, region including dangerous line) to the set determination region. In the fourth example embodiment, the added region is not limited. For example, the added region is a region including a region in which a notification at the time when the water level rises or the like is determined (dangerous line). Alternatively, the added region is a non-water region that is not a water region such as an empty region.

Next, the fourth example embodiment will be described with reference to the drawings.

[Description of Configuration]

A configuration of the region determining device 14 according to the fourth example embodiment will be described with reference to the drawings.

Figure 6:
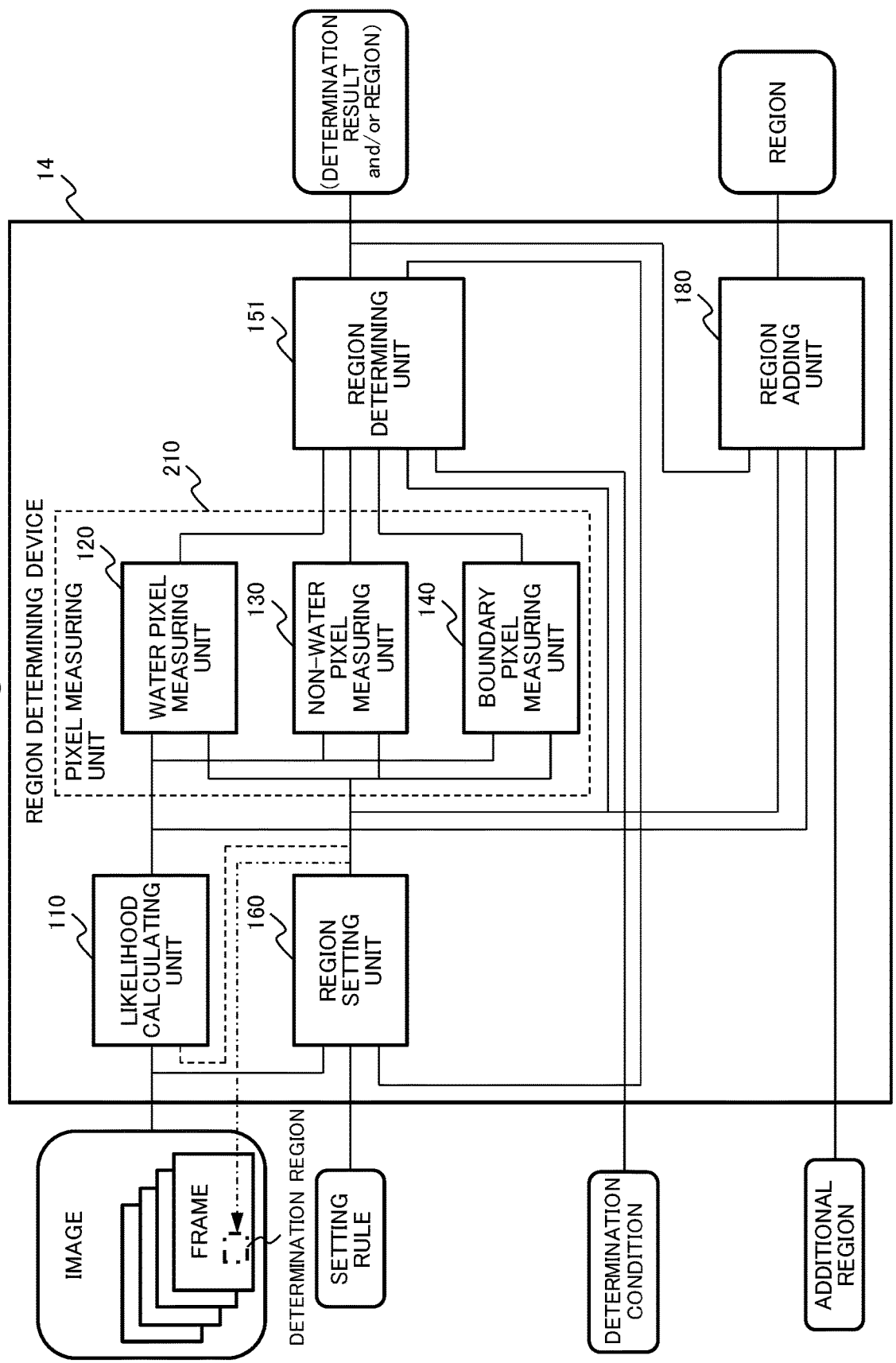
FIG. 6 is a block diagram illustrating an example of a configuration of a region determining device according to a fourth example embodiment.

FIG. 6 is a block diagram illustrating an example of the configuration of the region determining device 14 according to the fourth example embodiment.

The region determining device 14 includes a region adding unit 180, in addition to the configuration of the region determining device 12 according to the second example embodiment. Detailed description of the component similar to that in the second example embodiment is appropriately omitted, and a specific configuration of the region determining device 14 according to the fourth example embodiment will be described.

The region determining device 14 may include the region setting unit 161 and the region detecting unit 170 in the third example embodiment.

The region adding unit 180 outputs a region obtained by adding a predetermined additional region to a determination region output from the region determining unit 151. An acquisition source of the additional region of the region adding unit 180 is not limited. It is sufficient that the region adding unit 180 acquire the additional region from an external device which is not illustrated or the like.

A part of the additional region may overlap with the determination region. In this case, it is sufficient that the region adding unit 180 output a region obtained by adding the additional region that is not included in the determination region to the determination region.

Alternatively, the additional region may be a region away from the determination region. In this case, the region adding unit 180 may output the determination region and the additional region or may output a region including the determination region, the additional region, and a region between the determination region and the additional region.

[Additional Configuration]

A large number of images and monitoring cameras are used for actual monitoring. Therefore, a large number of man-hours are required for setting a region of a dangerous line. The region determining device 14 may determine the additional region based on predetermined reference information.

Figure 7:
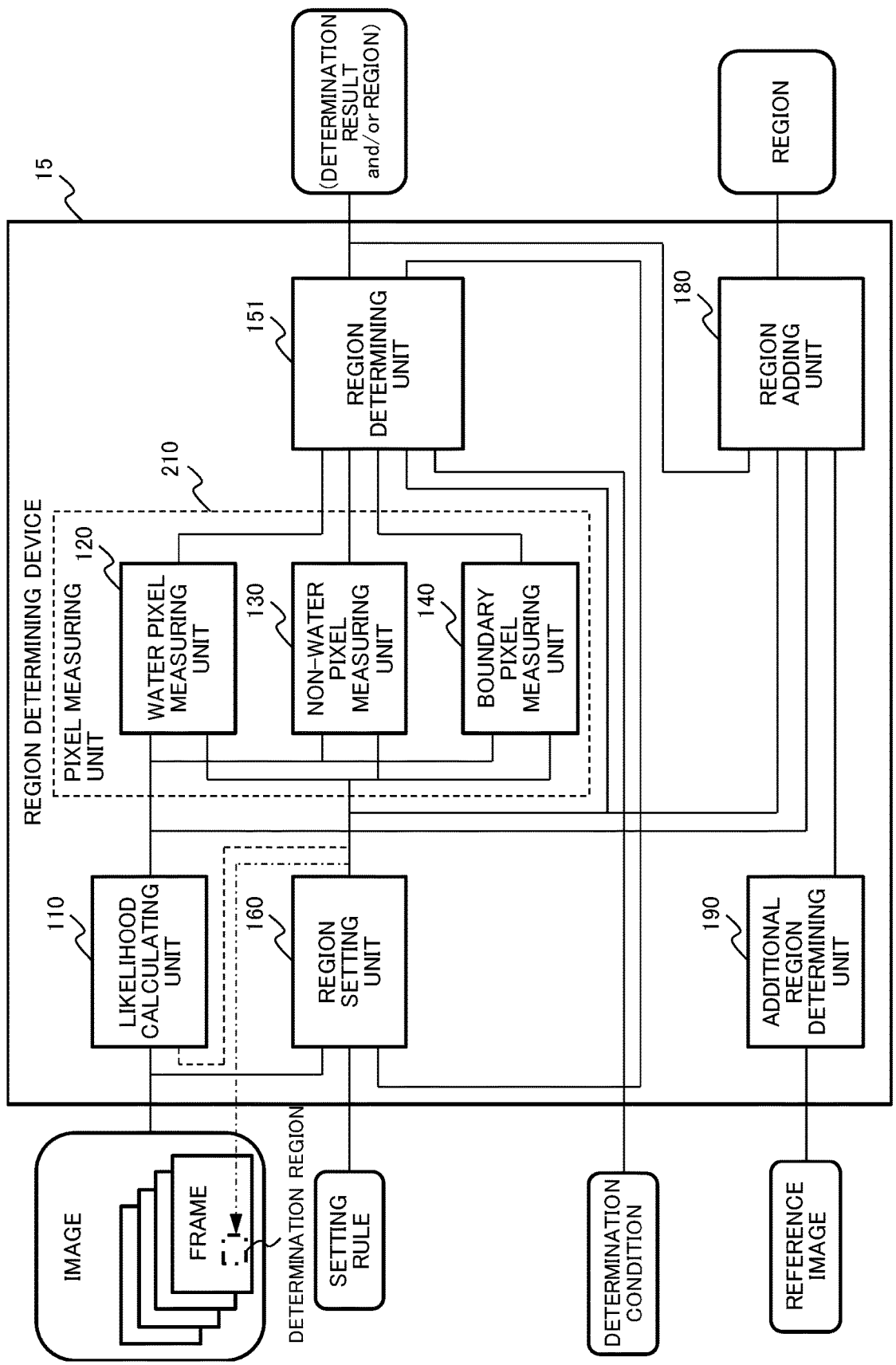
FIG. 7 is a block diagram illustrating an example of a configuration of a region determining device including an additional region determining unit.

FIG. 7 is a block diagram illustrating an example of a configuration of a region determining device 15 including an additional region determining unit 190.

The region determining device 15 includes the additional region determining unit 190 in addition to the configuration of the region determining device 14.

The additional region determining unit 190 determines a region to be added. For example, the additional region determining unit 190 acquires a reference image including the water level at the time when the water level rises from a device which is not illustrated and determines an additional region by using the acquired reference image.

As a more specific example, a case where a region including the dangerous line at the time when the water level of the river rises is added will be described.

When the water level rises to a dangerous degree, a color and/or a state of water of the river (for example, shape of wave, the number of waves, whether bubbles are generated, or the like) and a flow rate of the river change. Therefore, the additional region determining unit 190 acquires an image having features of the water level and/or a water surface at the time when the water level rises as a reference image. Then, the additional region determining unit 190 determines a water level in the image having the features at the time when the water level rises as the dangerous line. Then, the additional region determining unit 190 determines a region including the dangerous line as the additional region.

It is sufficient that the additional region determining unit 190 acquire, for example, an image when predetermined weather information (for example, heavy rain warning or flood warning) is issued from a predetermined organization (for example, Japan Meteorological Agency or weather forecasting company) as a reference image.

Alternatively, the additional region determining unit 190 may determine a region including a monitoring target (for example, bridge, sluice gate, and/or embankment) of the water level when the water level rises as the additional region.

The additional region determining unit 190 notifies the region adding unit 180 of the determined additional region.

The region adding unit 180 adds the notified additional region to the determination region output from the region determining unit 151.

[Description of Effect]

Next, effects of the region determining devices 14 and 15 according to the fourth example embodiment will be described.

The region determining devices 14 and 15 can achieve an effect for outputting a region used for predetermined processing (for example, detection of rise of water level), in addition to the effect according to the second example embodiment.

This is because the region adding unit 180 outputs a region obtained by adding a predetermined additional region to the determination region output from the region determining unit 151.

Moreover, the region determining device 15 can achieve an effect for reducing the number of man-hours for creating the additional region.

This is because the additional region determining unit 190 determines the additional region based on the reference information.

Outline of Example Embodiment

An outline of the example embodiment of the present invention will be described with reference to the drawings.

Figure 8:
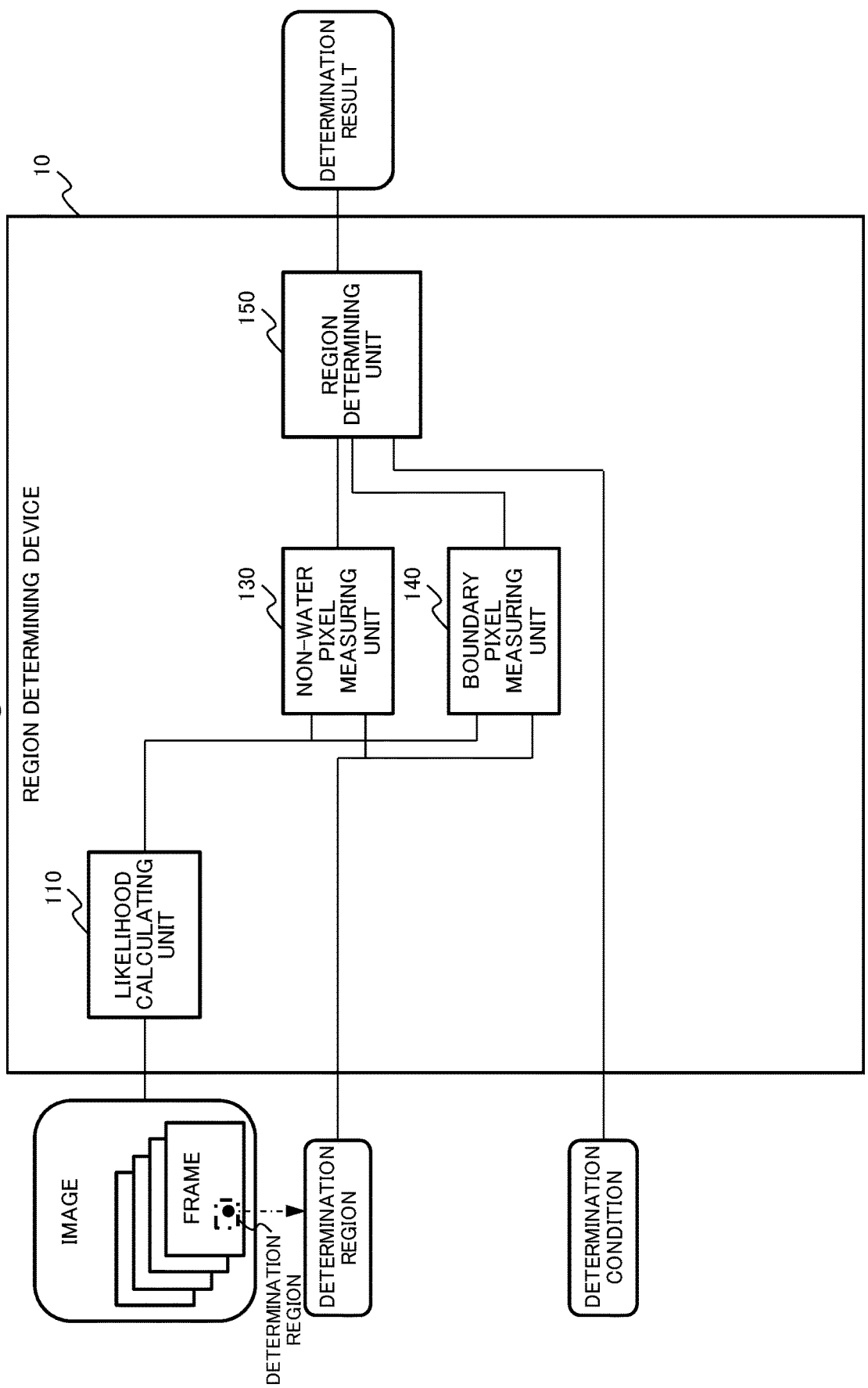
FIG. 8 is a block diagram illustrating an example of a configuration of a region determining device that is an example of an outline of an example embodiment according to the present invention.

FIG. 8 is a block diagram illustrating an example of a configuration of a region determining device 10 that is an example of the outline of the example embodiment according to the present invention.

The region determining device 10 includes a likelihood calculating unit 110, a non-water pixel measuring unit 130, a boundary pixel measuring unit 140, and a region determining unit 150. The likelihood calculating unit 110 calculates a likelihood of wetness of a pixel in an image including a plurality of frames. The non-water pixel measuring unit 130 measures the number of non-water pixels in which the likelihood falls within the first non-water range in any one of the determination regions to be determined in each frame. The boundary pixel measuring unit 140 measures the number of boundary pixels in which the likelihood falls within the first water range in any one of the determination regions and the likelihood falls within the second non-water range in any one of the determination regions. The region determining unit 150 determines whether the determination region satisfies a predetermined determination condition based on the number of non-water pixels and the number of boundary pixels.

Each component of the region determining device 10 operates similarly to each corresponding component of the region determining device 11 or the like.

The region determining device 10 having such a configuration can achieve an effect similar to that of the region determining device 11.

This is because each component of the region determining device 10 operates similarly to the similar component of the region determining device 11 and outputs an evaluation result for the determination region.

The region determining device 10 is a minimum configuration according to the example embodiment of the present invention.

<Hardware Configuration>

Next, a configuration of hardware will be described by using the region determining device 10. The region determining devices 11 to 14 may be configured by using a configuration similar to the following hardware configuration.

For example, each component of the region determining device 10 may include a hardware circuit.

Alternatively, in the region determining device 10, each component may be configured by using a plurality of devices connected via a network.

Alternatively, in the region determining device 10, a plurality of components may be configured by single hardware.

Alternatively, the region determining device 10 may be implemented as a computer device including a Central Processing Unit (CPU), a Read Only Memory (ROM), and a Random Access Memory (RAM). The region determining device 10 may be implemented as a computer device further including an Input and Output Circuit (IOC) in addition to the above configuration. The region determining device 10 may be implemented as a computer device further including a Network Interface Circuit (NIC) in addition to the above configuration.

FIG. 9 is a block diagram illustrating a configuration of an information processing apparatus 600 that is an example of the hardware configuration of the region determining device 10.

The information processing apparatus 600 includes a CPU 610, a ROM 620, a RAM 630, an internal storage device 640, an IOC 650, and an NIC 680 and configures a computer device.

The CPU 610 reads a program from the ROM 620. Then, the CPU 610 controls the RAM 630, the internal storage device 640, the IOC 650, and the NIC 680 based on the read program. Then, the computer including the CPU 610 controls these components and implements each of the functions as the likelihood calculating unit 110, the non-water pixel measuring unit 130, the boundary pixel measuring unit 140, and the region determining unit 150 illustrated in FIG. 8.

The CPU 610 may use the RAM 630 or the internal storage device 640 as a temporary storage medium of the program when each function is implemented.

The CPU 610 may read the program included in a storage medium 700 that stores a computer-readable program by using a storage medium reading device which is not illustrated. Alternatively, the CPU 610 may receive a program from an external device which is not illustrated via the NIC 680, save the program in the RAM 630 or the internal storage device 640, and operate based on the saved program.

The ROM 620 stores the program executed by the CPU 610 and fixed data. The ROM 620 is, for example, a Programmable-ROM (P-ROM) or a flash ROM.

The RAM 630 temporarily stores the program executed by the CPU 610 and data. The RAM 630 is, for example, a Dynamic-RAM (D-RAM).

The internal storage device 640 stores data and a program that are saved in the information processing apparatus 600 in the long term. The internal storage device 640 may operate as a temporary storage device of the CPU 610. The internal storage device 640 is, for example, a hard disk device, a magneto-optical disk device, a Solid State Drive (SSD), or a disk array device.

The ROM 620 and the internal storage device 640 are non-volatile (non-transitory) storage media. The RAM 630 is a volatile (transitory) storage medium. Then, the CPU 610 can operate based on the program stored in the ROM 620, the internal storage device 640, or the RAM 630. That is, the CPU 610 can operate by using the non-volatile storage medium or the volatile storage medium.

The IOC 650 mediates data between the CPU 610, the input device 660, and a display device 670. The IOC 650 is, for example, an IO interface card or a Universal Serial Bus (USB) card. Moreover, the IOC 650 may use a wireless card without limiting to wired cards such as the USB.

The input device 660 is a device that receives an input instruction from an operator of the information processing apparatus 600. The input device 660 is, for example, a keyboard, a mouse, or a touch panel.

The display device 670 is a device that displays information to the operator of the information processing apparatus 600. The display device 670 is, for example, a liquid crystal display.

The NIC 680 relays data exchange with an external device (not illustrated) via a network. The NIC 680 is, for example, a Local Area Network (LAN) card. Moreover, the NIC 680 may use a wireless network without limiting to the wired network.

The information processing apparatus 600 having such a configuration can achieve an effect similar to that of the region determining device 10.

This is because the CPU 610 of the information processing apparatus 600 can achieve a function similar to that of the region determining device 10 based on the program.

<Monitoring System>

FIG. 10 is a block diagram illustrating an example of a monitoring system 60 including the region determining device 11. The monitoring system 60 may include any one of the region determining devices 10 and 12 to 15 instead of the region determining device 11.

The monitoring system 60 includes a monitoring camera 20, a switching device 30, a display monitor 40, the region determining device 11, and a warning device 50.

The monitoring camera 20 captures an image (moving image) of a monitoring target. The number of monitoring cameras 20 is not limited. The monitoring system 60 may include the single monitoring camera 20 or may include the plurality of monitoring cameras 20.

The switching device 30 selects a monitoring camera 20 that is connected to the display monitor 40 or the like at predetermined intervals and in accordance with a predetermined switching rule from among the plurality of connected monitoring cameras 20 and outputs an image of the selected monitoring camera 20 on the display monitor 40 or the like. In a case where the monitoring system 60 includes the single monitoring camera 20, the monitoring system 60 does not include the switching device 30.

The display monitor 40 displays the image from the switching device 30. The monitoring system 60 may include the single display monitor 40 or may include the plurality of display monitors 40. In a case where the monitoring system 60 includes the single monitoring camera 20, the monitoring system 60 includes the single display monitor 40. In this case, the display monitor 40 displays the image from the monitoring camera 20.

As described above, the region determining device 11 determines the determination region based on the image and the determination condition and transmits the determination result to the warning device 50.

A device from which the region determining device 11 acquires an image or the like is not limited. It is sufficient that the region determining device 11 acquire the image from the monitoring camera 20, the switching device 30, or the warning device 50. It is sufficient that the region determining device 11 receive the determination condition and the determination region from the warning device 50 or an external device which is not illustrated.

The warning device 50 determines whether to use the determination region for determination of a warning based on the determination result of the region determining device 11.

In a case where the warning device 50 transmits the determination region to the region determining device 11, the warning device 50 may repeat the transmission of the determination region and the reception of the determination result until the determination condition is satisfied.

In a case where the determination region satisfies the determination condition, the warning device 50 determines whether the warning is issued by using the determination region. When the determination region is in a state where the warning is issued, the warning device 50 issues the warning.

The warning device 50 may issue a warning by using the display monitor 40 that displays the determination region or an alarm device which is not illustrated.

Since the warning device 50 in the monitoring system 60 having such a configuration uses the determination region that satisfies the determination condition, an appropriate warning by the warning device 50 can be achieved.

In a case where the monitoring system 60 includes the region determining device 12 or 13, the warning device 50 can receive the determination region that satisfies the setting rule and the determination condition from the region determining device 12 or 13. In this case, it is sufficient that the warning device 50 use the determination region for the determination of the warning.

In a case where the monitoring system 60 includes the region determining device 14 or 15, it is sufficient that the warning device 50 operate by using a region including the additional region received from the region determining device 14 or 15.

(Outline of Monitoring System)

FIG. 11 is a diagram illustrating an example of a configuration of a monitoring system 61 that is an outline of the monitoring system 60.

The monitoring system 61 includes the monitoring camera 20, the region determining device 11, and the warning device 50.

The monitoring camera 20 captures an image. The region determining device 11 determines the determination region in the image from the monitoring camera 20. The warning device 50 determines whether the determination region in the image is used for the determination of the warning based on the result determined by the region determining device 11.

The monitoring system 61 having such a configuration can achieve an effect similar to that of the monitoring system 60.

This is because the devices included in the monitoring system 61 operate similarly to the corresponding devices included in the monitoring system 60.

The monitoring system 61 is an example of a minimum configuration of the monitoring system 60.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 10 region determining device
11 region determining device
12 region determining device
13 region determining device
14 region determining device
15 region determining device
20 monitoring camera
30 switching device
40 display monitor
50 warning device
60 monitoring system
61 monitoring system
110 likelihood calculating unit
120 water pixel measuring unit
130 non-water pixel measuring unit
140 boundary pixel measuring unit
150 region determining unit
151 region determining unit
160 region setting unit
161 region setting unit
170 region detecting unit
180 region adding unit
190 additional region determining unit
210 pixel measuring unit
600 information processing apparatus
610 CPU
620 ROM
630 RAM
640 internal storage device
650 IOC
660 input device
670 display device
680 NIC
700 storage medium

The invention claimed is:

1. A region determining device comprising:
at least one processor configured to:
    calculate a likelihood of wetness of a pixel in an image including a plurality of frames;
    measure the number of non-water pixels in which the likelihood falls within a first non-water range in any one of determination regions to be determined in the respective frames;
    measure the number of boundary pixels in which the likelihood falls within a first water range in any one of the determination regions and the likelihood falls within a second non- water range in any one of the determination regions; and
    determine whether the determination region satisfies a predetermined determination condition based on the number of non-water pixels and the number of boundary pixels.

2. The region determining device according to claim 1, wherein
the at least one processor is further configured to measure the number of water pixels in which the likelihood falls within a second water range in any one of the determination regions, wherein
the at least one processor further determines the determination region by using the number of water pixels.

3. The region determining device according to claim 2, wherein
the non-water pixel is a pixel in which the likelihood falls within the first non-water range in the determination regions equal to or more than a first number of frames, the boundary pixel is a pixel in which the likelihood falls within the first water range in the determination regions equal to or more than a second number of frames and the likelihood falls within the second non-water range in the determination regions equal to or more than a third number of frames, and the water pixel is a pixel in which the likelihood falls within the second water range in the determination regions equal to or more than the-a fourth number of frames.

4. The region determining device according to claim 1 wherein the at least one processor is further configured to set the determination region based on a predetermined setting rule, wherein the at least one processor repeats the setting of the determination region until the determination region satisfies the determination condition and outputs the determination region that satisfies the determination condition.

5. The region determining device according to claim 4 wherein the at least one processor is further configured to detect, in the image, an unrecommended region that is better not to be included in the determination region and/or a recommended region that is better to be included in the determination region, wherein the at least one processor sets the determination region by referring to the unrecommended region and/or the recommended region.

6. The region determining device according to claim 5, wherein the at least one processor is further configured to determine an additional region to be added to the determination region based on a position of a water level in a predetermined reference image; and add the additional region to the determination region.

7. The region determining device according to claim 1 wherein the at least one processor is further configured to set a plurality of the determination regions in the image based on a predetermined setting rule, wherein the at least one processor outputs the determination region that satisfies the determination condition from among the set determination regions.

8. A monitoring system comprising:

a monitoring camera configured to capture the image;

the region determining device according to claim 1 configured to determine the determination region by using an image; and a warning device configured to determine whether the determination region in the image is used for determination of a warning based on a result determined by the region determining device.

9. A region determining method comprising:

by at least one processor, calculating a likelihood of wetness of a pixel in an image including a plurality of frames;

measuring the number of non-water pixels in which the likelihood falls within a first non- water range in any one of determination regions to be determined in the respective frames;

measuring the number of boundary pixels in which the likelihood falls within a first water range in any one of the determination regions and the likelihood falls within a second non-water range in any one of the determination regions; and determining whether the determination region satisfies a predetermined determination condition based on the number of non-water pixels and the number of boundary pixels.

10. A non-transitory recording medium for recording a program for causing a computer to execute:

calculating a likelihood of wetness of a pixel in an image including a plurality of frames;

measuring the number of non-water pixels in which the likelihood falls within a first non- water range in any one of determination regions to be determined in the respective frames;

measuring the number of boundary pixels in which the likelihood falls within a first water range in any one of the determination regions and the likelihood falls within a second non-water range in any one of the determination regions; and determining whether the determination region satisfies a predetermined determination condition based on the number of non-water pixels and the number of boundary pixels.

* * * * *